(12) United States Patent
Mitsugi et al.

(10) Patent No.: US 10,395,406 B2
(45) Date of Patent: Aug. 27, 2019

(54) APPARATUS, METHOD, PROGRAM AND COMMUNICATION SYSTEM FOR DISPLAYING INFORMATION ACCORDING TO A RESIDUAL VOLTAGE OF A POWER SUPPLY OF AN INFORMATION DISPLAY APPARATUS

(71) Applicant: Sony Corporation, Tokyo (JP)

(72) Inventors: Masakazu Mitsugi, Kanagawa (JP); Yuki Sugiue, Tokyo (JP); Hiroshi Saeki, Tokyo (JP); Machiko Takematsu, Kanagawa (JP); Masaaki Yamamoto, Chiba (JP); Yoichi Ito, Tokyo (JP); Kenji Itoh, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/504,451

(22) PCT Filed: Aug. 21, 2015

(86) PCT No.: PCT/JP2015/073468
§ 371 (c)(1),
(2) Date: Feb. 16, 2017

(87) PCT Pub. No.: WO2016/035571
PCT Pub. Date: Mar. 10, 2016

(65) Prior Publication Data
US 2017/0243385 A1    Aug. 24, 2017

(30) Foreign Application Priority Data

Sep. 4, 2014   (JP) ................................. 2014-180536
Mar. 9, 2015   (JP) ................................. 2015-045905

(51) Int. Cl.
*G06T 11/60* (2006.01)
*A44C 5/00* (2006.01)
(Continued)

(52) U.S. Cl.
CPC ............... *G06T 11/60* (2013.01); *A44C 5/00* (2013.01); *A44C 5/0069* (2013.01); *G04B 37/16* (2013.01);
(Continued)

(58) Field of Classification Search
None
See application file for complete search history.

(56) References Cited

U.S. PATENT DOCUMENTS 9,367,085 B2 *   6/2016   Alberth, Jr. ............. G06F 1/163
2001/0043513 A1 * 11/2001  Grupp ...................... G04G 9/00
                                                         368/281
(Continued)

FOREIGN PATENT DOCUMENTS

JP      49-126369       12/1974
JP      02-069693        3/1990
(Continued)

OTHER PUBLICATIONS

International Search Report from PCT/JP2015/073468, dated Nov. 17, 2015, 3 pgs.

*Primary Examiner* — Michael J Cobb
(74) *Attorney, Agent, or Firm* — Lerner, David, Littenberg, Krumholz & Mentlik, LLP

(57) ABSTRACT

The present disclosure relates to an apparatus and method for displaying information, a program, and a communication system, which enable the provision of an apparatus making use of a display device excellent in flexibility.
An information display apparatus includes a display unit including a time information presenting section for presenting at least time information and a band section to be worn on an arm, and a display control unit for changing a display of the display unit. The present disclosure can be applied to, for example, the information display apparatus.

18 Claims, 23 Drawing Sheets

(51) Int. Cl.
*G09G 3/34* (2006.01)
*G09G 3/20* (2006.01)
*G09F 9/00* (2006.01)
*G04B 37/16* (2006.01)
*G04G 9/00* (2006.01)
*G04C 10/04* (2006.01)

(52) U.S. Cl.
CPC ............... *G04G 9/00* (2013.01); *G09F 9/00* (2013.01); *G09G 3/20* (2013.01); *G09G 3/34* (2013.01); *G09G 3/344* (2013.01); *G04C 10/04* (2013.01); *G09G 2330/022* (2013.01); *G09G 2330/023* (2013.01); *G09G 2354/00* (2013.01); *G09G 2370/02* (2013.01); *G09G 2370/16* (2013.01); *G09G 2380/02* (2013.01)

(56) References Cited

U.S. PATENT DOCUMENTS

| | | | | |
|---|---|---|---|---|
| 2002/0099452 A1* | 7/2002 | Kawai | ................. | G04G 9/0011 700/16 |
| 2003/0002391 A1* | 1/2003 | Biggs | ................. | G04G 9/00 368/82 |
| 2005/0174302 A1 | 8/2005 | Ishii | | |
| 2008/0002527 A1 | 1/2008 | Ishii et al. | | |
| 2008/0318636 A1* | 12/2008 | Kim | ................. | G06F 1/163 455/566 |
| 2014/0045547 A1* | 2/2014 | Singamsetty | ......... | G06F 1/1643 455/552.1 |
| 2014/0189584 A1* | 7/2014 | Weng | ................. | G06F 1/163 715/808 |
| 2014/0233357 A1* | 8/2014 | Miwa | ................. | G04G 9/08 368/47 |
| 2014/0267360 A1* | 9/2014 | Finkel | ................. | G06T 11/001 345/590 |
| 2015/0033049 A1* | 1/2015 | Zhao | ................. | H04M 1/2745 713/320 |
| 2015/0227180 A1* | 8/2015 | Rabii | ................. | G06F 1/26 713/323 |
| 2015/0253739 A1* | 9/2015 | Iida | ................. | G04G 9/00 368/80 |
| 2016/0011653 A1* | 1/2016 | Kotkajuuri | ............. | G06F 1/163 713/323 |
| 2016/0071480 A1* | 3/2016 | Hsiao | ................. | G06F 1/3265 345/212 |
| 2016/0073351 A1* | 3/2016 | Cardozo | ........... | H04W 52/0258 455/574 |
| 2016/0155375 A1* | 6/2016 | Park | ................. | G06F 1/1628 345/173 |
| 2016/0378067 A1* | 12/2016 | Bishop | ................. | G04F 3/06 368/241 |
| 2017/0255169 A1* | 9/2017 | Lee | ................. | G04G 21/08 |
| 2018/0203500 A1* | 7/2018 | Kim | ................. | G06F 1/3287 |

FOREIGN PATENT DOCUMENTS

| | | |
|---|---|---|
| JP | 08-201548 | 8/1996 |
| JP | 2003344573 A | 12/2003 |
| JP | 2004028918 A | 1/2004 |
| JP | 2005250442 A | 9/2005 |
| JP | 2006284365 A | 10/2006 |
| JP | 2007285748 A | 11/2007 |
| JP | 2008008832 A | 1/2008 |
| JP | 2008039697 A | 2/2008 |
| JP | 2012189419 A | 10/2012 |
| JP | 2013064610 A | 4/2013 |

* cited by examiner

APPARATUS, METHOD, PROGRAM AND COMMUNICATION SYSTEM FOR DISPLAYING INFORMATION ACCORDING TO A RESIDUAL VOLTAGE OF A POWER SUPPLY OF AN INFORMATION DISPLAY APPARATUS

CROSS-REFERENCE TO RELATED APPLICATIONS

This application is a national phase entry under 35 U.S.C. § 371 of International Application No. PCT/JP2015/073468 filed Aug. 21, 2015, which claims the priority from Japanese Patent Application No. 2014-180536, filed in the Japanese Patent Office on Sep. 4, 2014, and Japanese Patent Application No. 2015-045905, filed in the Japanese Patent Office on Mar. 9, 2015, the entire contents which are hereby incorporated by reference.

TECHNICAL FIELD

The present disclosure relates to an apparatus and method for displaying information, a program, and a communication system, and particularly relates to an apparatus and method for displaying information, a program, and a communication system, which enable the provision of an apparatus that makes use of a display device excellent in flexibility.

BACKGROUND ART

There is an electrophoretic display (Electrophoretic Display) generally also called electronic paper. The electrophoretic display simply requires the passage of electric current only at the time of switching of a display, and does not require the passage of current to maintain the display. Accordingly, the electrophoretic display has a feature of low power consumption. Moreover, the electrophoretic display has a thin film shape, can deform its shape freely to some extent, and is excellent in flexibility.

Electronic paper used for the display of a dial of a wall-mount clock is proposed (see, for example, Patent Document 1). Moreover, there is electronic paper used for the display of a dial of a wristwatch (see, for example, Patent Document 2).

CITATION LIST

Patent Documents

Patent Document 1: Japanese Patent Application Laid-Open No. 2008-39697
Patent Document 2: Japanese Patent Application Laid-open No. 2007-285748

SUMMARY OF THE INVENTION

Problems to be Solved by the Invention

In recent years, it is being desired that a product using a display device that is excellent in flexibility as in an electrophoretic display is developed.

The present disclosure has been made considering such circumstances, and enables the provision of an apparatus making use of a display device that is excellent in flexibility.

Solutions to Problems

An information display apparatus according to a first aspect of the present disclosure includes: a display unit including a time information presenting section for presenting at least time information, and a band section to be worn on an arm; and a display control unit for changing a display of the display unit.

An information display method of an information display apparatus according to a second aspect of the present disclosure includes a display control unit of the information display apparatus changing a display of a display unit including a time information presenting section for presenting at least time information and a band section to be worn on an arm.

A program according to a third aspect of the present disclosure is the program for causing a computer to function as a display control unit for changing a display of a display unit including a time information presenting section for presenting at least time information and a band section to be worn on an arm.

In the first to third aspects of the present disclosure, the display of the display unit including the time information presenting section for presenting at least time information and the band section to be worn on an arm is changed.

A communication system according to a fourth aspect of the present disclosure includes: an information display apparatus; and a terminal apparatus, wherein the information display apparatus includes a display unit including a time information presenting section for presenting at least time information, and a band section to be worn on an arm, a display control unit for changing a display of the display unit, and a communication unit for receiving, from the terminal apparatus, design data to be displayed on the display unit, and the terminal apparatus transmits the design data to the communication unit.

In the fourth aspect of the present disclosure, the information display apparatus receives the design data to be displayed on the display unit, and changes the display of the display unit including the time information presenting section for presenting at least time information and the band section to be worn on an arm. The terminal apparatus transmits the design data to the communication unit of the information display apparatus.

Incidentally, the program can be provided by being transmitted via a transmission medium, or recorded in a recording medium.

The information display apparatus may be an independent apparatus, or may be an internal block configuring one device.

Effects of the Invention

According to the first to fourth aspects of the present disclosure, an apparatus making use of a display device that is excellent in flexibility can be provided.

Incidentally, the effects described herein are not necessarily limited and may be any of the effects described in the present disclosure.

MODES FOR CARRYING OUT THE INVENTION

Modes for carrying out the present disclosure (hereinafter referred to as the embodiments) are described hereinafter. Incidentally, a description is given in the following order:
1. First Embodiment (a configuration example where a display pattern is changed with internal data), and
2. Second Embodiment (a configuration example where the display pattern is changed with data acquired from a server).

<1. First Embodiment of Watch>
<External Configuration Example of Watch>

Firstly, a first embodiment of a watch according to the present disclosure is described.

Figure 1:
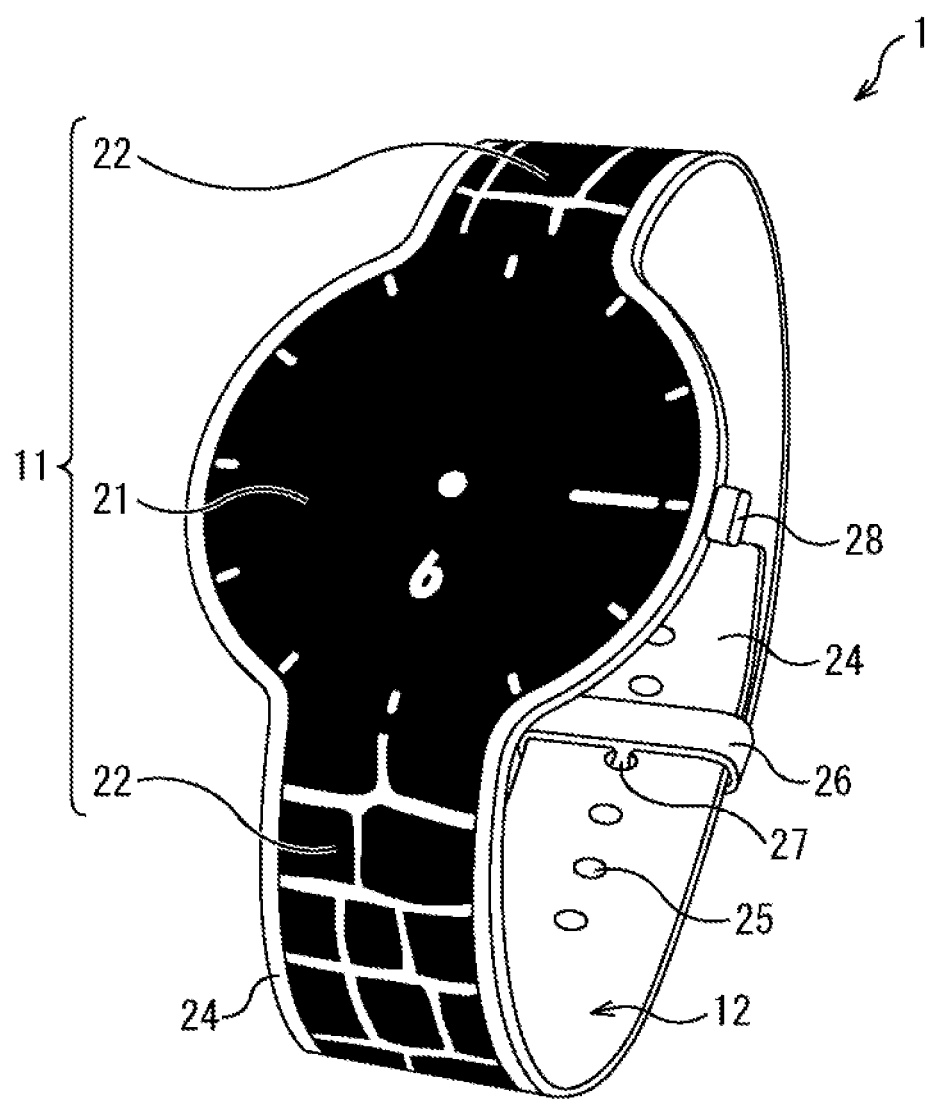
FIG. 1 is a diagram illustrating an external configuration example of a watch according to a first embodiment.

FIG. 1 illustrates an external configuration example of the watch according to the first embodiment.

A wristwatch 1 illustrated in FIG. 1 is a watch used worn on an arm (wrist).

The wristwatch 1 is configured including a substantially circular face section 21 being a time information presenting section for displaying time information such as a scale, numbers, a minute hand, and an hour hand, and a band section (bracelet section) 22 to be worn on an arm. The face section 21 and the band section 22 form a display unit 11.

In FIG. 1, number "6" displayed on the face section 21 indicates the hour (six), and a hand displayed near a mark at three o'clock indicates the minute hand. Therefore, the wristwatch 1 illustrated in FIG. 1 indicates that the time is 6:15. The band section 22 has a display illustrating a pattern design.

The face section 21 and the band section 22 are fitted in an integrally-molded rubber band 24. The rubber band 24 is molded thick at the outer edge such that the surface of the wristwatch 1 is on the same plane when the face section 21 and the band section 22 are fitted into it.

A plurality of recesses 25 is formed near one end of a back 12 of the rubber band 24 along its longitudinal direction, and a buckle 26 is formed at the other end. A protrusion 27 formed on the buckle 26 is inserted into a predetermined recess 25, corresponding to the size of the wrist of a user, of the plurality of recesses 25 formed in the rubber band 24 to fix the wristwatch 1 to the arm of the user.

A push button 28 is placed on a side of the face section 21. The push button 28 functions as a selection unit that accepts the user's push operation and accepts the user's selection operation. Incidentally, a configuration is also acceptable in which, for example, a digital crown, instead of the push button 28, is provided.

In the wristwatch 1 configured as described above, the display unit 11 forms the surfaces of both the face section 21 and the band section 22. Accordingly, a display of the display unit 11 is updated to enable changes in the display contents of the face section 21 and the band section 22. Consequently, it is possible to update time information on the face section 21 and change the band design (pattern design information) of the band section 22.

<Control Block Diagram of Watch>

Figure 2:
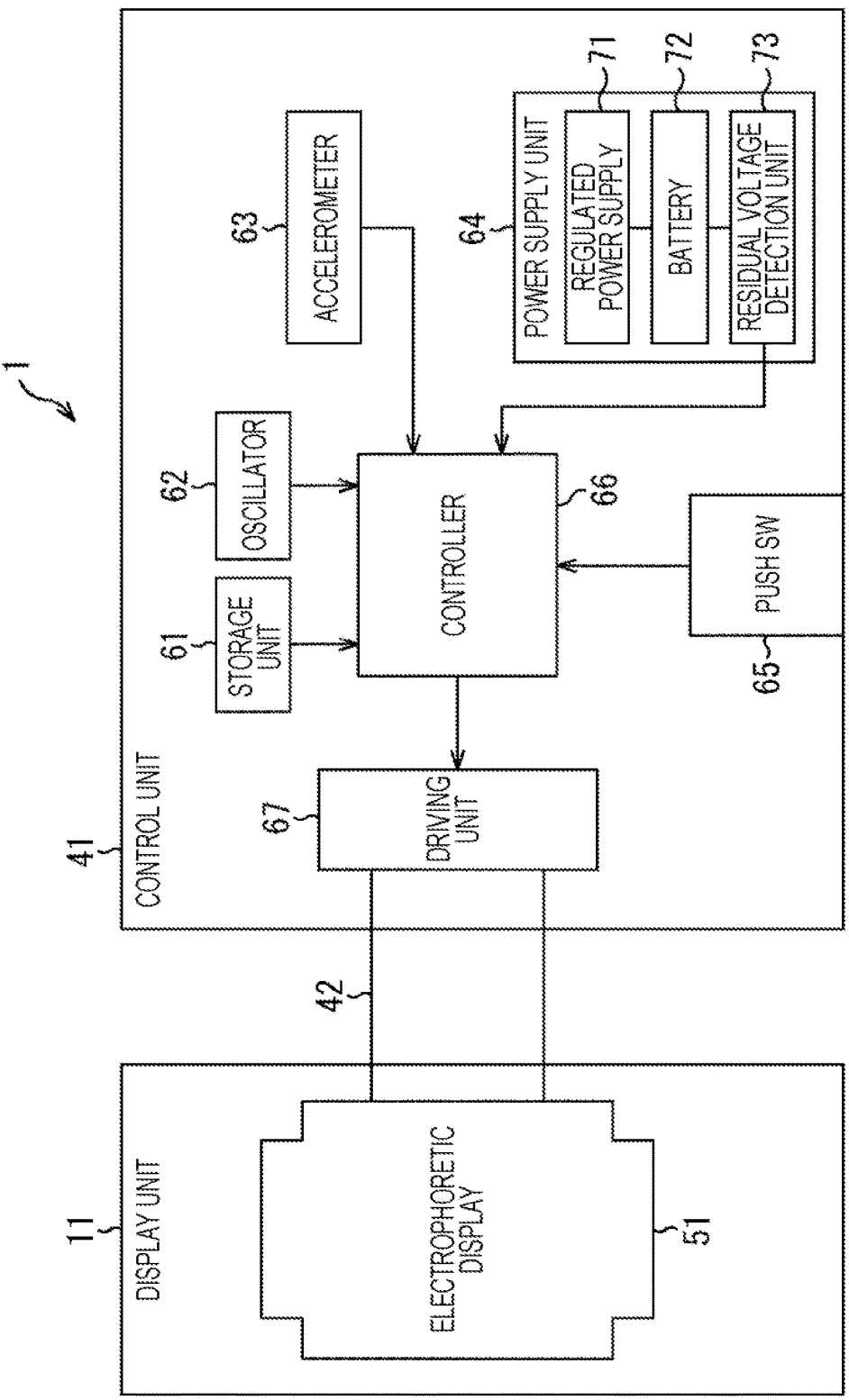
FIG. 2 is a control block diagram related to display control of a wristwatch according to the first embodiment.

FIG. 2 illustrates a control block diagram related to display control of the wristwatch 1.

The wristwatch 1 includes the display unit 11 and a control unit 41 that controls the display unit 11.

The display unit 11 includes an electrophoretic display (Electrophoretic Display) 51 also called electronic paper or EPD, and provides a predetermined display through control from the control unit 41.

The structure of the electrophoretic display 51 is briefly described.

The electrophoretic display 51 has, for example, a structure where upper and lower surfaces of a microcapsule-filled layer are sandwiched between electrode layers, and the electrode layer that is visually perceived by the user includes a transparent electrode layer such as indium tin oxide (ITO) or ZnO.

The microcapsule-filled layer is filled with microcapsules each including a single or a plurality of particles in a transparent solution. For example, if two kinds of particles, white and black particles, are filled in a microcapsule in the microcapsule-filled layer, when a positive voltage is applied to the transparent electrode layer on the display surface side, the negatively charged white particles gather on the transparent electrode layer side to display white (color). Conversely, when a negative voltage is applied to the transparent electrode layer on the display surface side, the positively charged black particles gather on the transparent electrode layer side to display black (color). In this manner, the electrophoretic display 51 can display white or black by control over voltage to be applied to the electrode layer. Moreover, a display in black-and-white halftone (a display in gray) can also be possible by setting a plurality of levels of applied voltage.

A feature of the electrophoretic display 51 is low power consumption. In other words, the electrophoretic display 51 does not need backlight that is required by a liquid crystal display (LCD). Moreover, the electrophoretic display 51 is simply required to pass current only when the display is switched and does not need to pass current to maintain the display. Hence, the electrophoretic display 51 can provide a display with very lower power consumption than an LCD or the like.

Moreover, another feature of the electrophoretic display 51 is flexibility. In other words, the electrophoretic display 51 has a thin film shape and can deform its shape freely to some extent.

Incidentally, the electrophoretic display 51 does not need to be limited to the above-mentioned microcapsule technology. Furthermore, another technology other than the electrophoretic type known as the technology for the display of electronic paper is also acceptable. In other words, as a display of the display unit 11, the technology is not limited as long as it is electronic paper that can electronically rewrite display contents among display media that hold viewability and portability that are the advantages of paper.

The control unit 41 includes a storage unit 61, an oscillator 62, an accelerometer 63, a power supply unit 64, a push SW 65, a controller 66, and a driving unit 67.

The storage unit 61 includes a nonvolatile memory such as an electrically and erasable programmable read only memory (EEPROM), and stores various programs and various kinds of data necessary for control.

The storage unit 61 stores, for example, a program for controlling the display of the display unit 11 including the face section 21 and the band section 22, a program for time control based on a clock signal from the oscillator 62, and a program for operation control based on a sensor signal from the accelerometer 63. The program for controlling the display of the display unit 11 also includes design data specifying a display pattern of the display unit 11, the design data being described below with reference to FIG. 10.

The programs and data that are stored in the storage unit 61 are read out by the controller 66 if needed. Moreover, the storage unit 61 can be configured to be detachable from the wristwatch 1. Alternatively, the storage unit 61 may also be incorporated as part of the controller 66.

The oscillator 62 includes, for example, a crystal or ceramic resonator, or an oscillation circuit, generates a clock signal to become a base for time information, and supplies the clock signal to the controller 66.

The accelerometer 63 is a sensor that detects acceleration from three axes of an X axis, a Y axis, and a Z axis (a gyro sensor), and supplies the detection result to the controller 66.

The power supply unit 64 includes a regulated power supply 71, a battery 72, and a residual voltage detection unit 73. The power supply unit 64 causes the regulated power supply 71 to regulate a power supply voltage obtained from the battery 72 to a constant voltage, and supplies it to each portion of the control unit 41 that requires power supply. The residual voltage detection unit 73 detects the residual voltage of the battery 72 and, when the battery capacity of the battery 72 decreases to or below a fixed level, supplies a signal indicating as such to the controller 66.

The push switch (SW) 65 detects the user's operation on the push button 28 and outputs it as an electrical signal to the controller 66.

The controller 66 includes, for example, a microcomputer and a central processing unit (CPU), and executes processes of controlling the display of the display unit 11 with various programs read out from the storage unit 61. For example, the controller 66 uses a clock signal supplied from the oscillator 62 to supply a control signal for updating the time information of the display unit 11 to the driving unit 67. Moreover, for example, the controller 66 uses the detection result of the accelerometer 63 to supply a control signal for changing the display of the display unit 11 to the driving unit 67 when the wristwatch 1 enters a predetermined state. Specific display of the display unit 11 by the control by the controller 66 is described below.

The driving unit 67 includes, for example, a driver IC that drives the electrophoretic display 51. The driving unit 67 uses a control signal from the controller 66 to drive the electrophoretic display 51. The electrophoretic display 51 is divided into a plurality of segments. The driving unit 67 is controlled on a segment-by-segment basis. The electrophoretic display 51 and the driving unit 67 are connected by, for example, flexible printed circuits (FPC) 42.

<Cross-Sectional View>

Figure 3:
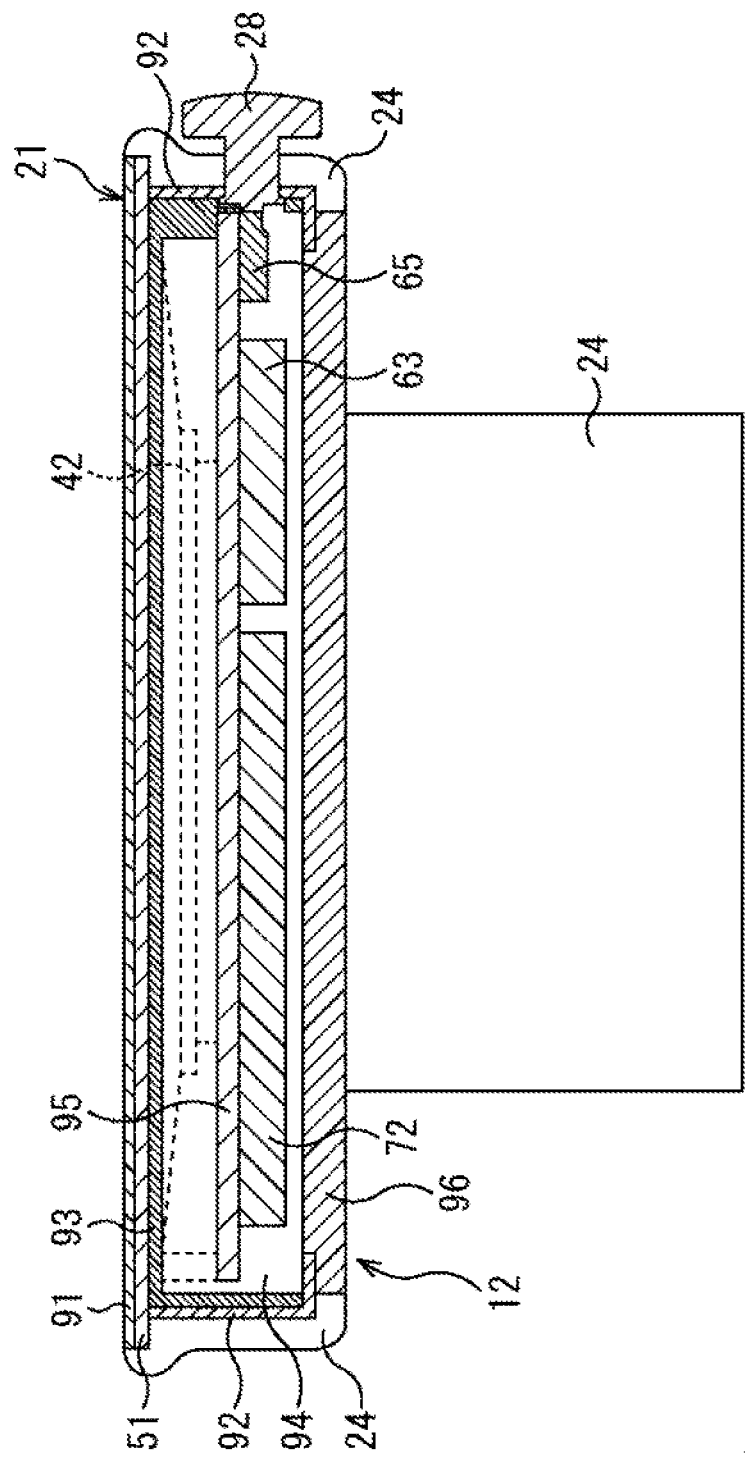
FIG. 3 is a cross-sectional view in a direction perpendicular to a longitudinal direction of the wristwatch.

FIG. 3 illustrates a cross-sectional view of the wristwatch 1 in a direction perpendicular to the longitudinal direction of the rubber band 24 through the push button 28.

Incidentally, in FIG. 3, the same reference signs are assigned to parts corresponding to FIGS. 1 and 2.

The electrophoretic display 51 is covered with a transparent protection sheet 91 and arranged in such a manner as to be on the same plane as the rubber band 24 on the periphery.

A printed board 95 is placed below the electrophoretic display 51, and is fixed and protected by a plurality of inner cases 92 to 94. The printed board 95 is equipped with the storage unit 61, the oscillator 62, the controller 66, and the like. The electrophoretic display 51 and the printed board 95 are connected by the FPC 42.

The push SW 65 provided on the back (lower side in FIG. 3) of the printed board 95 is placed in contact with the push button 28 to enable the detection of the operation of pressing the push button 28.

The accelerometer 63 and the battery 72 are also placed on the back of the printed board 95. A cover 96 on the back 12 of the wristwatch 1 is removed to expose the battery 72 in a replaceable manner.

Figure 4:
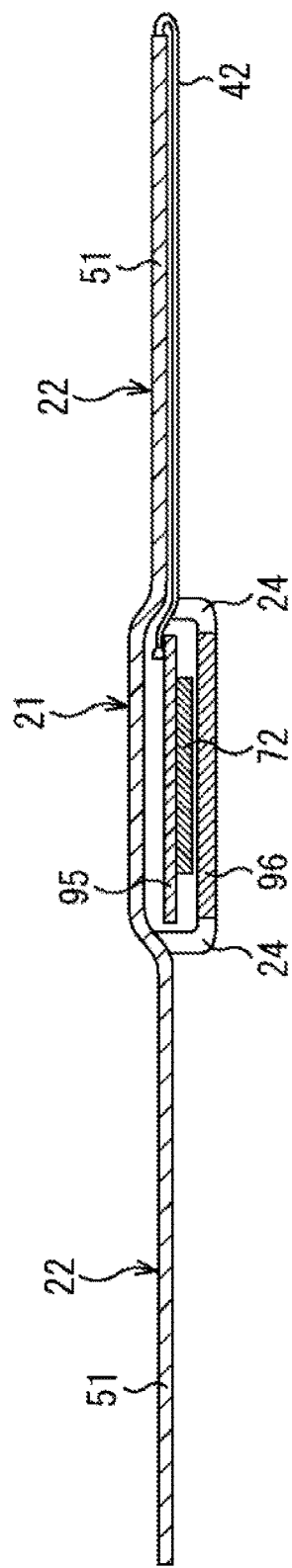
FIG. 4 is a cross-sectional view in a direction along the longitudinal direction of the wristwatch.

FIG. 4 is a cross-sectional view of the main structure of the wristwatch 1 in a direction along the longitudinal direction of the rubber band 24.

The electrophoretic display 51 formed in the face section 21 and the band section 22 is connected, at one end of the band section 22, to the FPC 42. The FPC 42 formed in a strip with substantially the same width as that of the band section 22 is folded back from a connection portion with the band section 22, and is connected to the printed board 95 placed on a back surface side of the face section 21. The FPC 42 is connected to an upper surface of the printed board 95. The battery 72 is placed on a lower surface side of the printed board 95.

Figure 5:
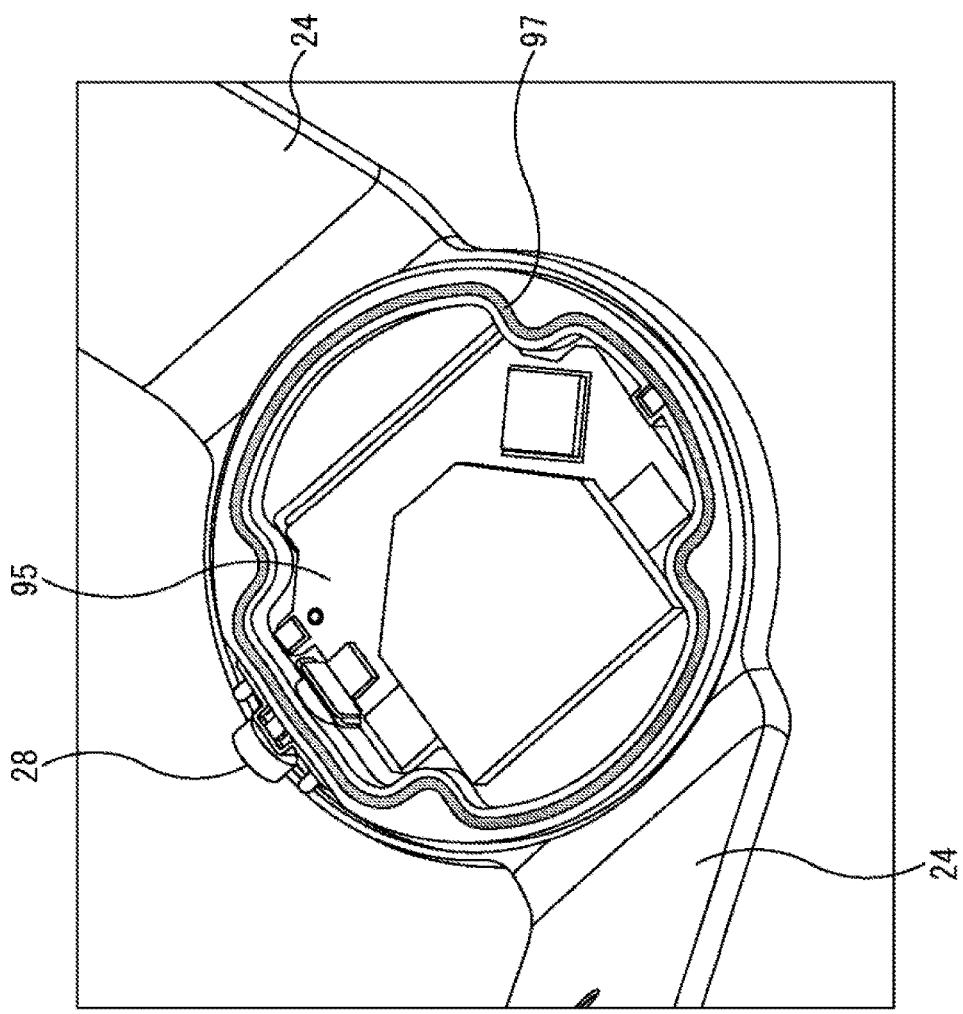
FIG. 5 is a perspective view illustrating the structure of the back of a face section.

FIG. 5 is a perspective view illustrating the structure of the back 12 of the face section 21, from which the cover 96 has been removed.

Circuits including the printed board 95 are integrated at the back of the face section 21. The periphery of the circuit part is surrounded by a gasket 97 with a water-proof function. The material of the gasket 97 is, for example, silicone rubber. In this manner, the wristwatch 1 encloses the circuit part within the gasket 97 to offer flexibility and waterproofness.

<Another Example of Circuit Placement>

Figure 6:
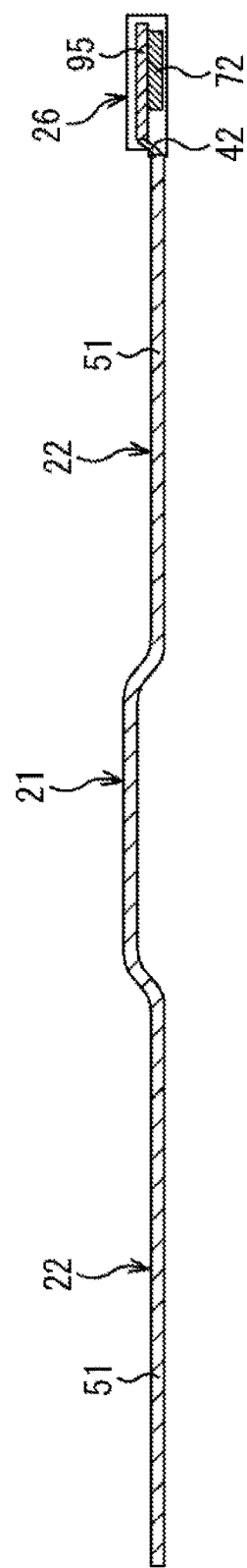
FIG. 6 is a diagram illustrating another example of circuit placement.

As described above, the embodiment adopts the placement where the electric circuits forming the control unit 41 are integrated in the lower part of the face section 21, what is called a dial section. For example, a configuration where the electric circuits forming the control unit 41 are placed in the buckle section 26 can also be adopted as illustrated in FIG. 6. In this case, the face section 21 can be made thin, and also the FPC 42 that connects the electrophoretic display 51 and the printed board 95 can be reduced (made smaller). In addition, there is no fold. Accordingly, the FPC 42 can be prevented from being damaged.

Figure 7:
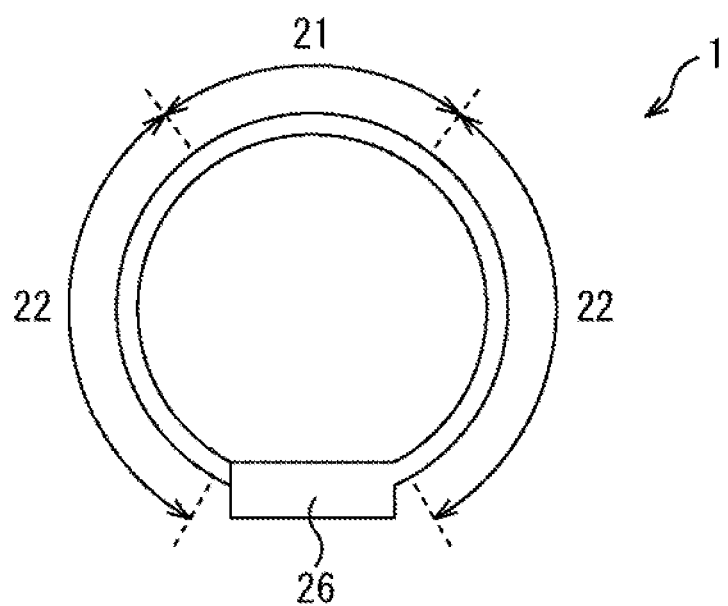
FIG. 7 is a diagram illustrating another example of circuit placement.

Moreover, as illustrated in FIG. 7, the face section 21 does not include the electric circuits; accordingly, the face section 21 can also be formed flexibly as in the band section 22.

Incidentally, all the electric circuits forming the control unit 41 may be placed in the buckle section 26. However, part of components such as a communication antenna, a sensor, and a battery may be placed in the band section 22.

<Another Example of Fastening>

Figure 8:
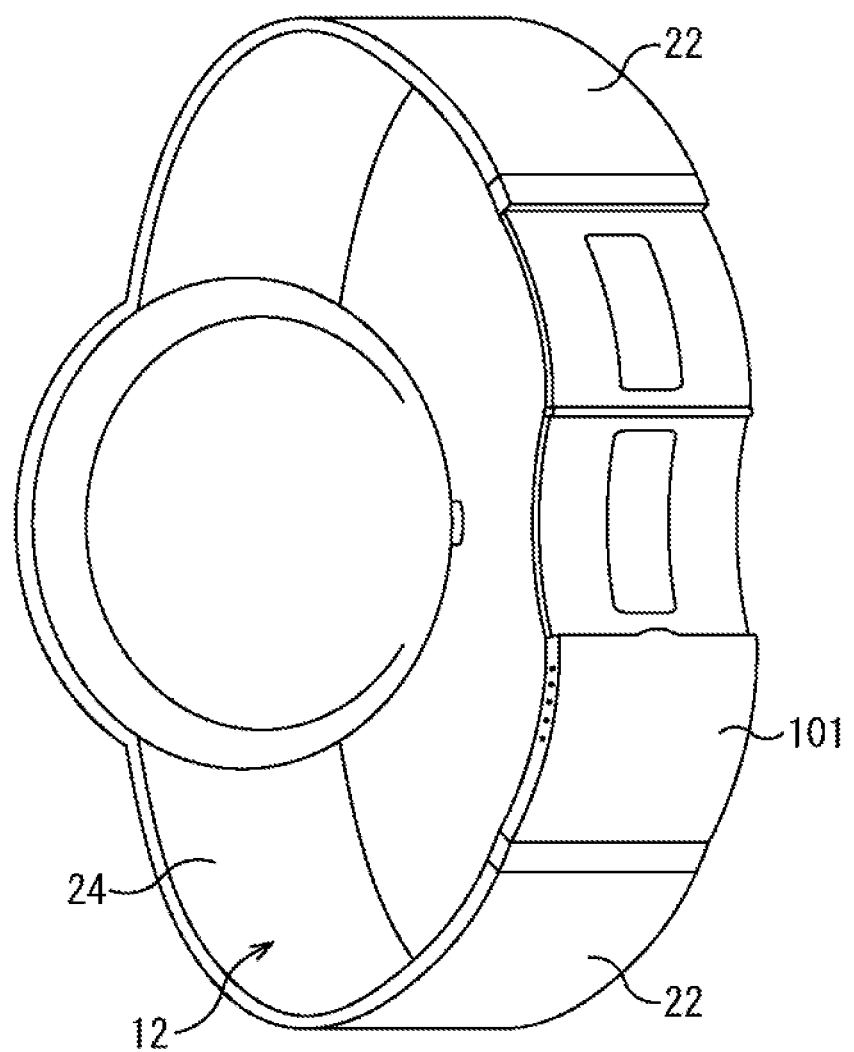
FIG. 8 is a diagram illustrating another example of a fastening.

FIG. 8 illustrates another example of the fastening for fixing the wristwatch 1 to an arm.

FIG. 1 illustrates the belt-type structure where the protrusion 27 provided to the buckle 26 is inserted into one of the plurality of recesses 25 provided in the rubber band 24 to fix (wear) the wristwatch 1 to (on) an arm.

However, as illustrated in FIG. 8, for example, a buckle 101 to be used for a watch with a metal bracelet can also be adopted as the fastening.

Figure 9:
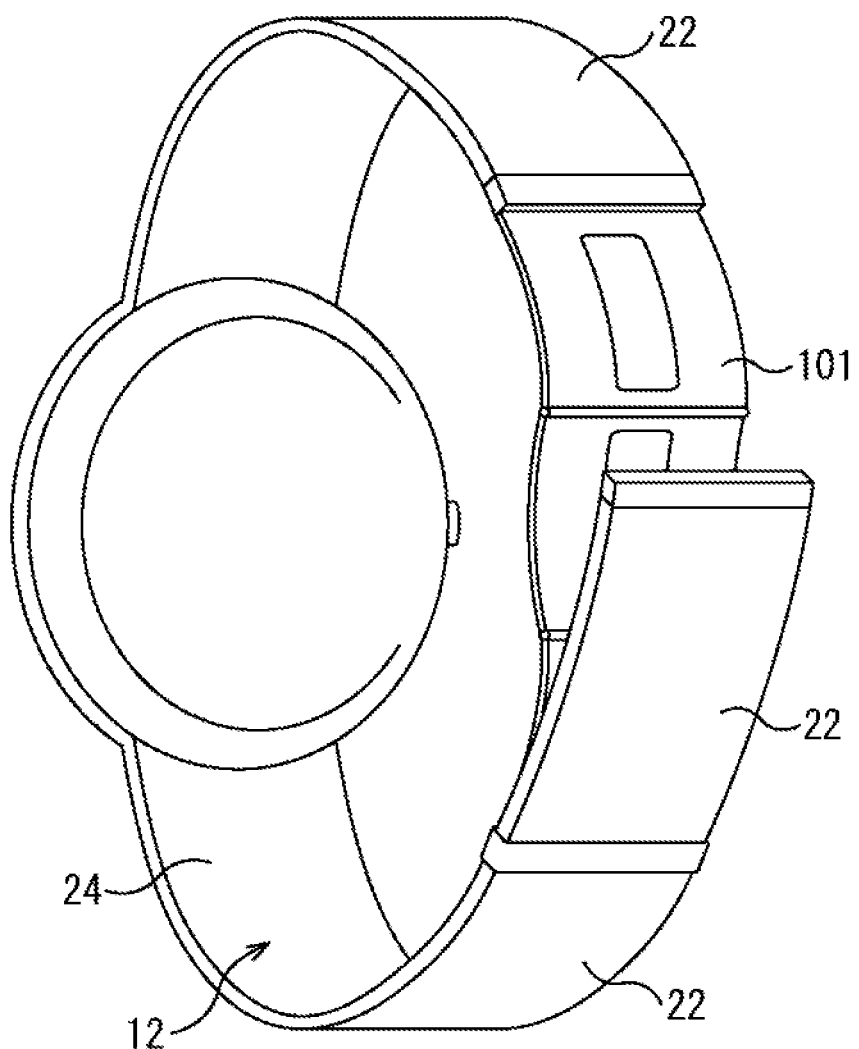
FIG. 9 is a diagram illustrating another example of the fastening.

Incidentally, the structure illustrated in FIG. 8 is an example of the structure where the buckle 101 is not included in the display unit 11. However, as illustrated in FIG. 9, a configuration can also be employed in which when the wristwatch 1 is fixed to an arm, the band section 22 is extended up to an upper surface of the buckle 101 such that the buckle 101 is hidden by the display unit 11. Accordingly, the upper surface of the buckle 101 can also serve as the display unit 11.

<Pattern Example of Display Pattern>

The wristwatch 1 is configured such that desired design data is selected from a plurality of kinds of design data stored in the storage unit 61 to allow the user to change the display pattern of the display unit 11 freely.

Figure 10:
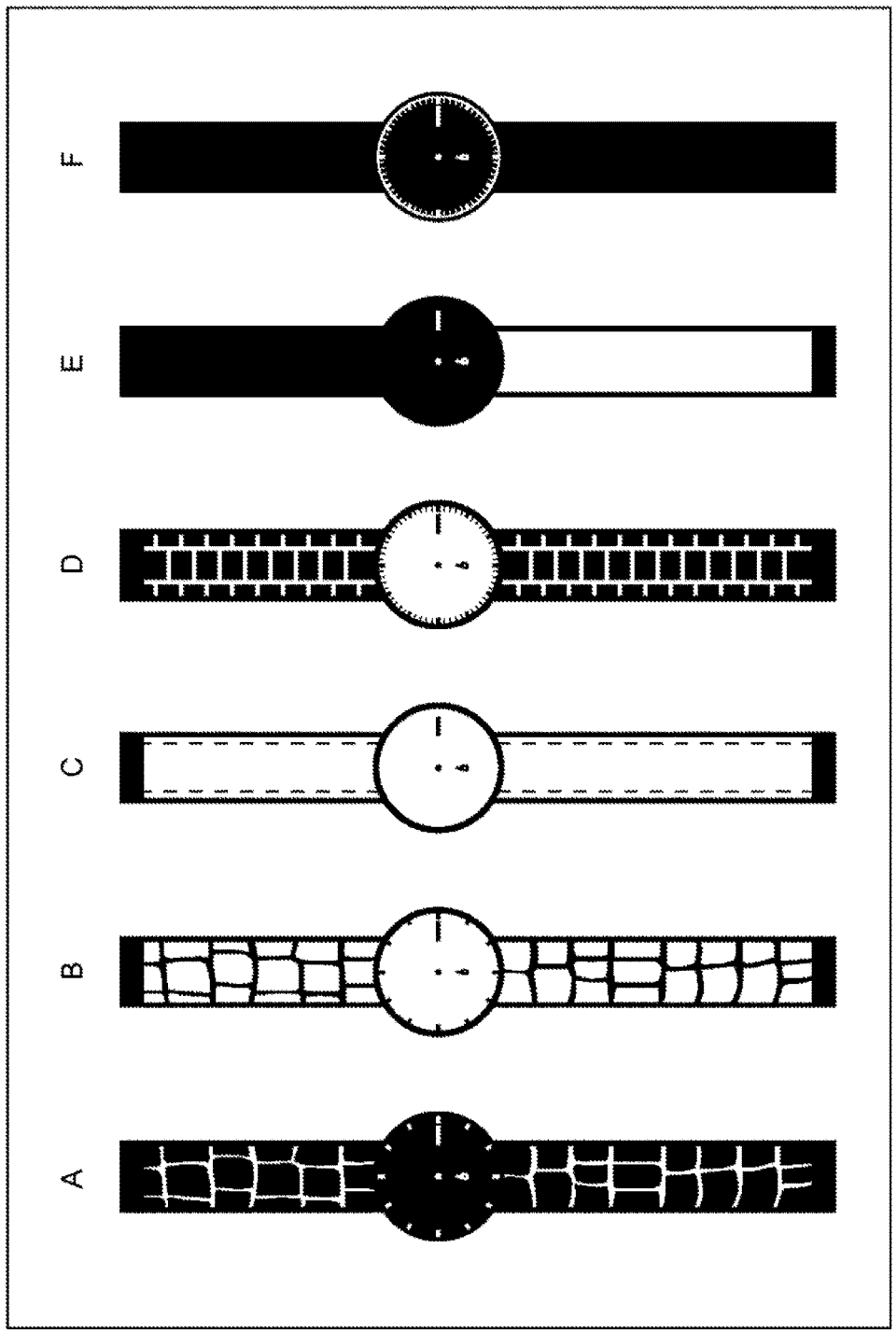
FIG. 10 is a diagram illustrating examples of six kinds of displayable display patterns.

FIG. 10 illustrates examples of six kinds of display patterns that can be displayed on the display unit 11 with the design data stored in the storage unit 61.

Incidentally, the reference signs are omitted in FIG. 10. Moreover, FIG. 10 illustrates examples where the color of the rubber band 24 formed on the periphery in such a manner as to surround the face section 21 and the band section 22 is black.

A and B of FIG. 10 are examples of display patterns of designs where the band section 22 is alligator skin-like.

C of FIG. 10 is an example of a display pattern of a design where the band section 22 imitates a stitched leather band.

D of FIG. 10 is an example of a display pattern of a design where the band section 22 imitates a metal bracelet.

E and F of FIG. 10 are examples of display patterns of designs where the band section 22 imitates plain leather bands.

The display patterns illustrated in A to F of FIG. 10 are mere examples. For example, design data that enables the display of 36 kinds of display patterns including the six kinds of display patterns illustrated in A to F of FIG. 10 is stored in the storage unit 61.

Figure 11:
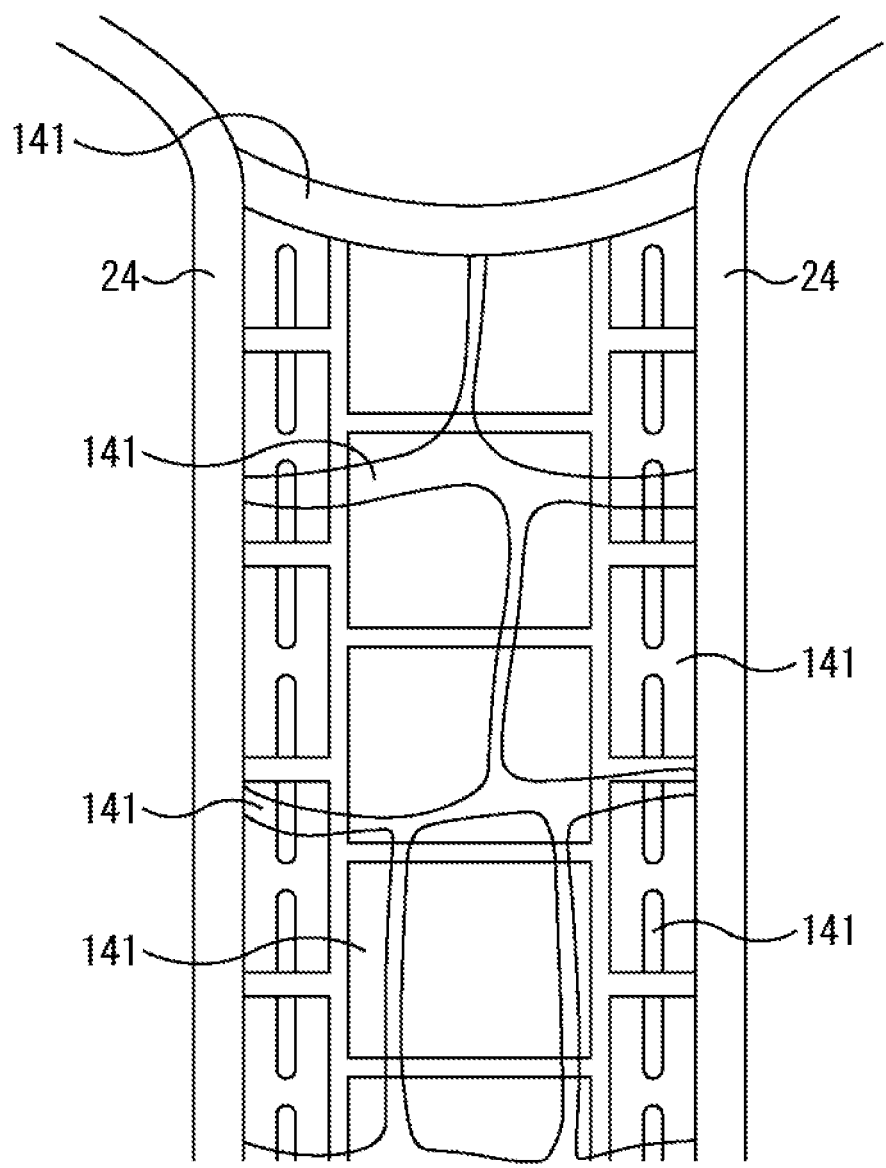
FIG. 11 is a diagram illustrating an example of a segment configuration of a band section.

FIG. 11 is a diagram illustrating an example of a segment configuration of the band section 22, the segment configuration achieving the display patterns of A to F of FIG. 10.

As illustrated in FIG. 11, the band section 22 is divided into segment areas 141 each being a control unit of the electrophoretic display 51 that controls the turning-on/off of display. In FIG. 11, each single area enclosed by a solid line represents the segment area 141. Although the illustration is omitted, the face section 21 is also divided into segment areas 141 corresponding to the display positions of the scale, the numbers, and the minute hand. In the embodiment, the number of the divided segment areas 141 of the electrophoretic display 51 is, for example, 89.

One piece of the design data stored in the storage unit 61 is, for example, data that specifies the turning-on/off of each of the 89 segment areas 141 of the electrophoretic display 51.

<Display Pattern Change Process>

Figure 12:
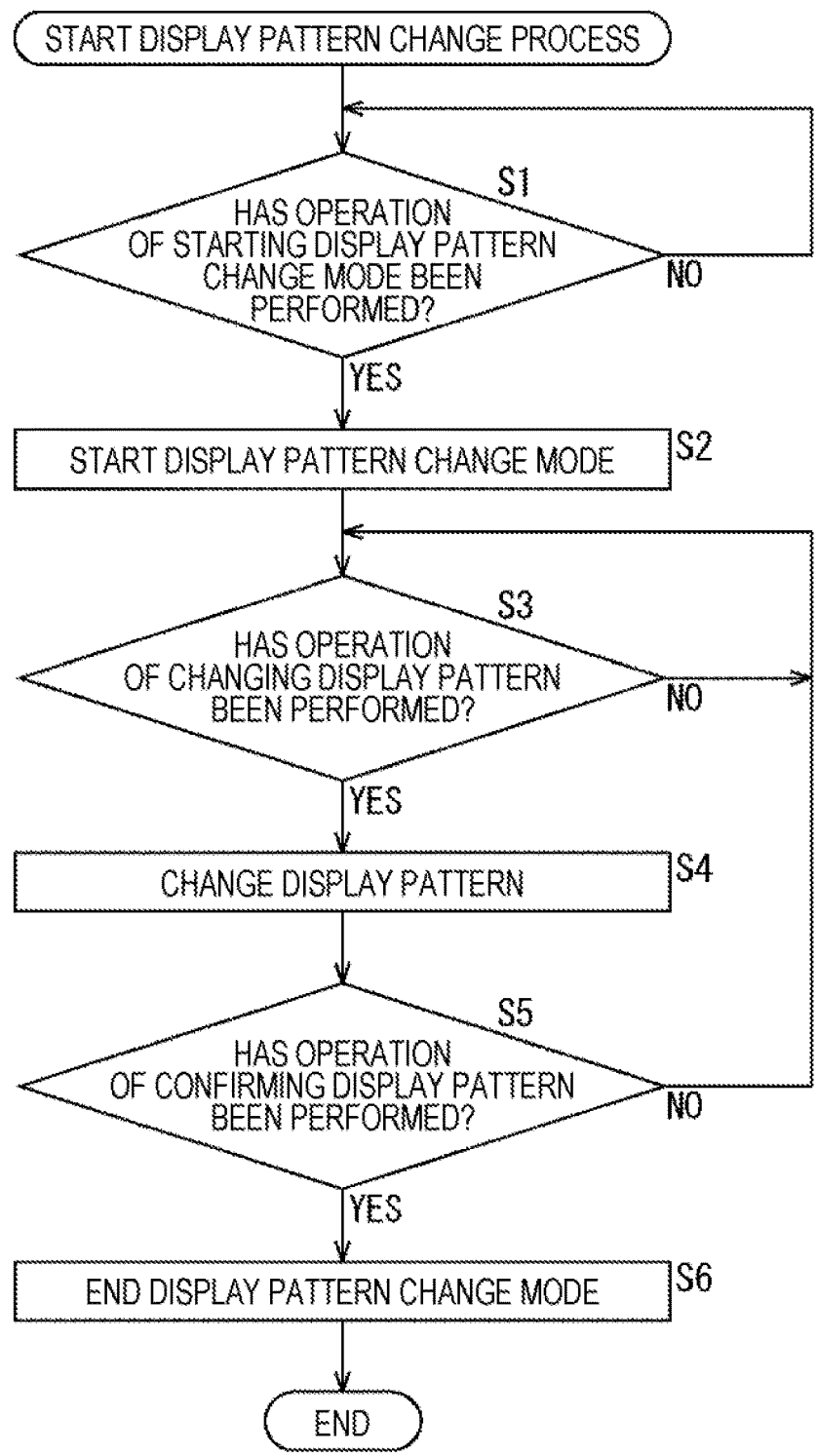
FIG. 12 is a flowchart describing a display pattern change process.

FIG. 12 is a flowchart of a display pattern change process of when the display pattern of the display unit 11 is changed.

In the display pattern change process, firstly in step S1, the controller 66 determines whether or not the user has performed a start operation of starting a display pattern change mode of changing the display pattern using a signal supplied from the push SW 65.

For example, an operation of holding down the push button 28 for a fixed period of time (for example, eight seconds) is performed to start the display pattern change mode in the wristwatch 1. The processing of step S1 is repeated until it is determined in step S1 that the user has performed the start operation of starting the display pattern change mode.

Then, if it is determined in step S1 that the user has performed the start operation of starting the display pattern change mode, the processing proceeds to step S2. The controller 66 starts the display pattern change mode. The controller 66 may provide a display that allows the user to recognize that the display pattern change mode has been started (for example, a display of a reversed display pattern).

In step S3, the controller 66 determines whether or not the user has performed an operation of changing the display pattern using a signal supplied from the push SW 65.

If, for example, a press operation on the push button 28 is specified as the operation of changing the display pattern in the wristwatch 1, whether or not the press operation on the push button 28 has been performed is detected in step S3. The processing of step S3 is repeated until it is determined in step S3 that the user has performed the operation of changing the display pattern.

If it is determined in step S3 that the operation of changing the display pattern has been performed, the processing proceeds to step S4. The controller 66 changes the display pattern of the display unit 11. Specifically, the controller 66 acquires, from the storage unit 61, design data of a display pattern different from a display pattern that is currently being displayed on the display unit 11, and supplies a control signal that drives the electrophoretic display 51 to the driving unit 67 on the basis of the acquired design data. The driving unit 67 uses the control signal corresponding to the new display pattern to drive each segment area 141 of the electrophoretic display 51.

In step S5, the controller 66 determines whether or not the user has performed an operation of confirming the display pattern.

In the embodiment, for example, the operation of holding down the push button 28 for a fixed period of time (for example, eight seconds) is the operation of confirming the display pattern. In this case, whether or not the operation of holding down the push button 28 for the fixed period of time is detected in step S5.

If it is determined in step S5 that the user has not performed the operation of confirming the display pattern, the processing returns to step S3 to repeat the above-mentioned processing of steps S3 to S5. In other words, the process of displaying a new display pattern on the display unit 11 in accordance with the user's operation of changing the display pattern is repeated until the display pattern is confirmed.

On the other hand, if it is determined in step S5 that the user has performed the operation of confirming the display pattern, the processing proceeds to step S6. The controller 66 ends the display pattern change mode that changes the display pattern to end the display pattern change process.

The above display pattern change process is executed in the wristwatch 1; accordingly, the user can select and display a desired display pattern from the plurality of display patterns. In other words, the user can have pleasure in switching not only the design of the face section 21 but also the design of the band section 22 according to the place, use, mood, and the like.

Incidentally, the start operation of starting the display pattern change mode and the operation of changing the display pattern are not limited to the above-mentioned example. The operations may be set such that, for example, when the push button 28 is pressed in a time display state where the current time is being displayed, the display pattern of the time display state can be changed, and when the push button 28 is pressed in a standby state where the current time is not being displayed, the display pattern in the standby state can be changed.

Moreover, the operations can be set such that, for example, if a digital crown that is rotated for drive, instead of the push button 28, is provided, the digital crown is pulled outward to enter the display pattern change mode, and when the digital crown is rotated, the display pattern is changed.

<Action Detection Process>

The accelerometer 63 is integrated in the wristwatch 1, and has an action detection mode that detects the motion of the wristwatch 1 with the accelerometer 63 and changes the display of the display unit 11 in accordance with the detected motion of the wristwatch 1.

Figure 13:
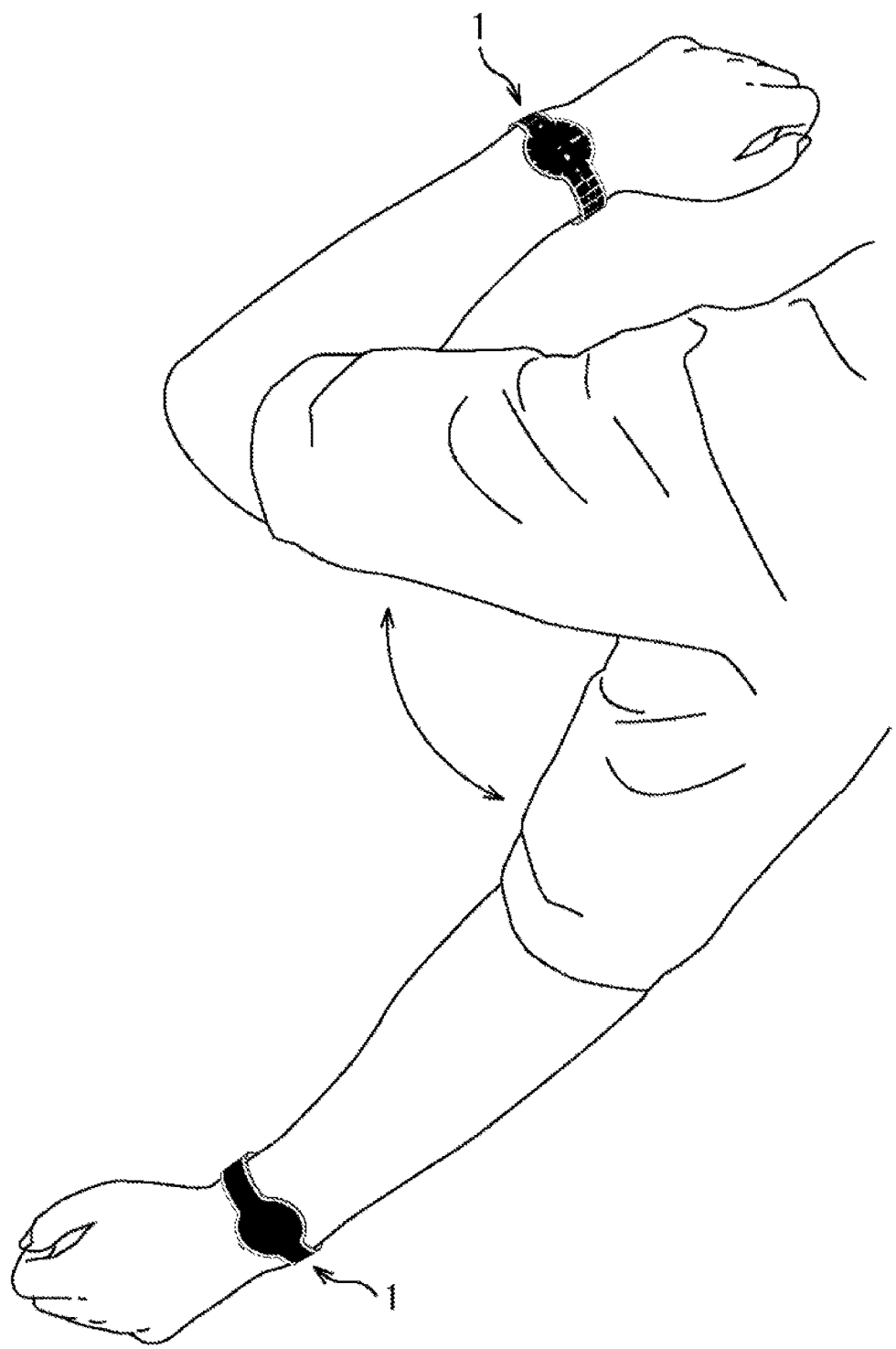
FIG. 13 is a diagram describing an action detection process.

If the action detection mode is executed, the wristwatch 1 can perform the display control such that, for example, only when the user looks at the wristwatch 1 to check the current time, the wristwatch 1 provides a display corresponding to the current time, and when the user is not looking at the wristwatch 1, the display unit 11 displays nothing, as illustrated in FIG. 13. When the user checks the current time, the wristwatch 1 is placed at a position substantially horizontal with respect to the ground. Hence, the wristwatch 1 uses a sensor signal of the accelerometer 63 to detect the horizontal state of the wristwatch 1, determines whether or not the user is looking at the wristwatch 1, and performs the display control described in FIG. 13.

Figure 14:
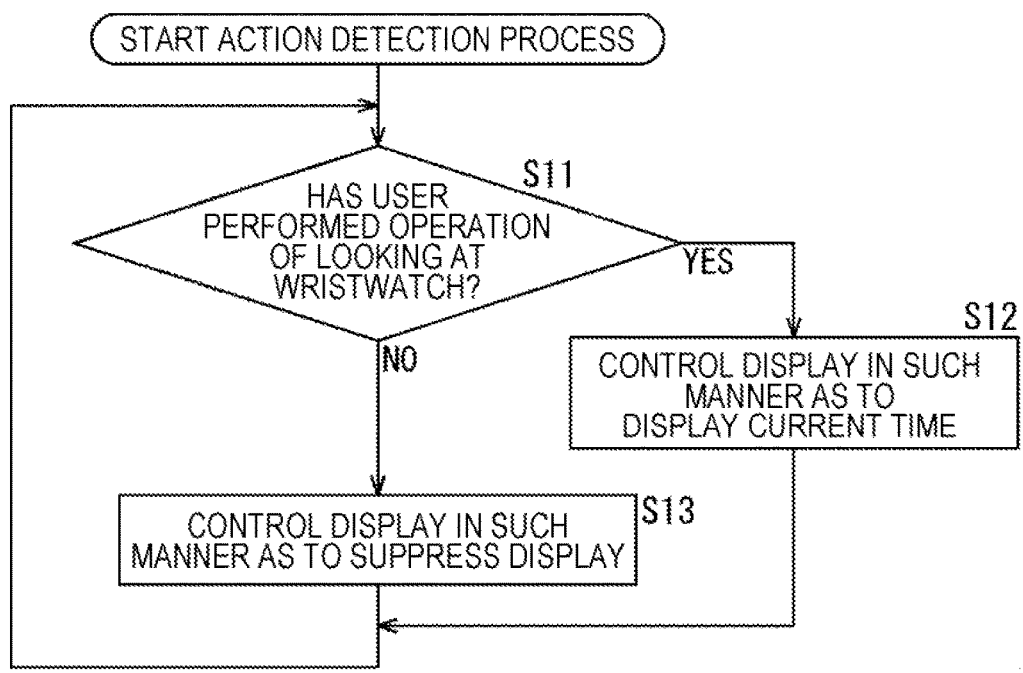
FIG. 14 is a flowchart describing the action detection process.

FIG. 14 is a flowchart of the action detection process that is performed by the controller 66 when the action detection mode is executed.

Firstly in step S11, the controller 66 determines whether or not the user has performed the operation of looking at the wristwatch 1. In other words, the controller 66 determines whether or not a sensor signal supplied from the accelerometer 63 indicates an angle within a predetermined range indicating the state where the wristwatch 1 is horizontal with respect to the ground and, if the sensor signal indicates the angle within the predetermined range indicating the horizontal state, determines that the user has performed the operation of looking at the wristwatch 1.

If it is determined in step S11 that the user has performed the operation of looking at the wristwatch 1, the processing proceeds to step S12. The controller 66 calculates the current time using a clock signal from the oscillator 62 and controls the display of the face section 21 in such a manner as to display the calculated current time. Moreover, the controller 66 also controls the display of the band section 22 in such a manner as to provide a display pattern selected by the user in the display pattern change process. As a result, the display unit 11 of the wristwatch 1 provides, for example, the display illustrated in FIG. 1.

On the other hand, if it is determined in step S11 that the user has not performed the operation of looking at the wristwatch 1, the processing proceeds to step S13. The controller 66 controls the display of the display unit 11 in such a manner as to suppress display. For example, the controller 66 controls the drive of the electrophoretic display 51 such that the whole area of the face section 21 and the band section 22 are white or black.

After the processing of step S12 or S13, the processing returns again to step S11 to execute the above-mentioned processing.

Incidentally, if a determination result of the next step S11 is the same as a determination result of the previous step S11, the processing of steps S12 and S13 can be omitted. This is because the electrophoretic display 51 has the feature where it is simply required to pass current only when the display is switched, and there is no need to pass current to maintain the display.

When the action detection mode is released, the action detection process of FIG. 14 ends.

As described above, the display of the display unit 11 including the face section 21 and the band section 22 can be changed using a sensor signal of the accelerometer 63.

Incidentally, it is natural that the wristwatch 1 can also execute an operation of displaying the current time all the time as a normal watch mode in addition to the action detection mode as in a general wristwatch.

In the above-mentioned example, when the user is not performing the operation of looking at the wristwatch 1, the display in the whole area of the face section 21 and the band section 22 is suppressed. However, a set display pattern may be displayed on the band section 22 all the time. The electrophoretic display 51 requires power only when the display is switched. Accordingly, even if a pattern is displayed on the band section 22 all the time, there is no influence on the power consumed.

As described below as a second embodiment, if the wristwatch 1 also includes a sensor 201 of a different type from the accelerometer 63, step S11's determination on whether or not the user has performed the operation of looking at the wristwatch 1 may be based on a detection result of the sensor 201 other than the accelerometer 63. If, for example, the sensor 201 is a brightness sensor, brightness above the dial is detected by the brightness sensor. When brightness at a predetermined level or higher is detected, it can be determined that the user has performed the operation of looking at the wristwatch 1.

<Another Example of Action Detection Process>

The controller 66 may detect a footstep count, movement speed, or the like using a sensor signal supplied from the accelerometer 63 and, when a predetermined footstep count or speed is detected, perform display control to change the display of at least one of the face section 21 and the band section 22.

Moreover, the controller 66 can also perform display control to change the display pattern of the display unit 11 in accordance with an elapsed time such as whenever the date changes, on the same day every week, at noon and night, and after the passage of every fixed time. Not only the face section 21 but also the band section 22 can change the display in the wristwatch 1 in the embodiment. Accordingly, unprecedented various displays are possible.

<Another Action Example of Action Detection Process>

In the action detection process described with reference to FIG. 14, the user's action of looking at the wristwatch 1 is determined from the sensor output of the accelerometer 63. However, the controller 66 can also determine another action of the user from the sensor output to change the display of the display unit 11 in accordance with the determination result.

Figure 15:
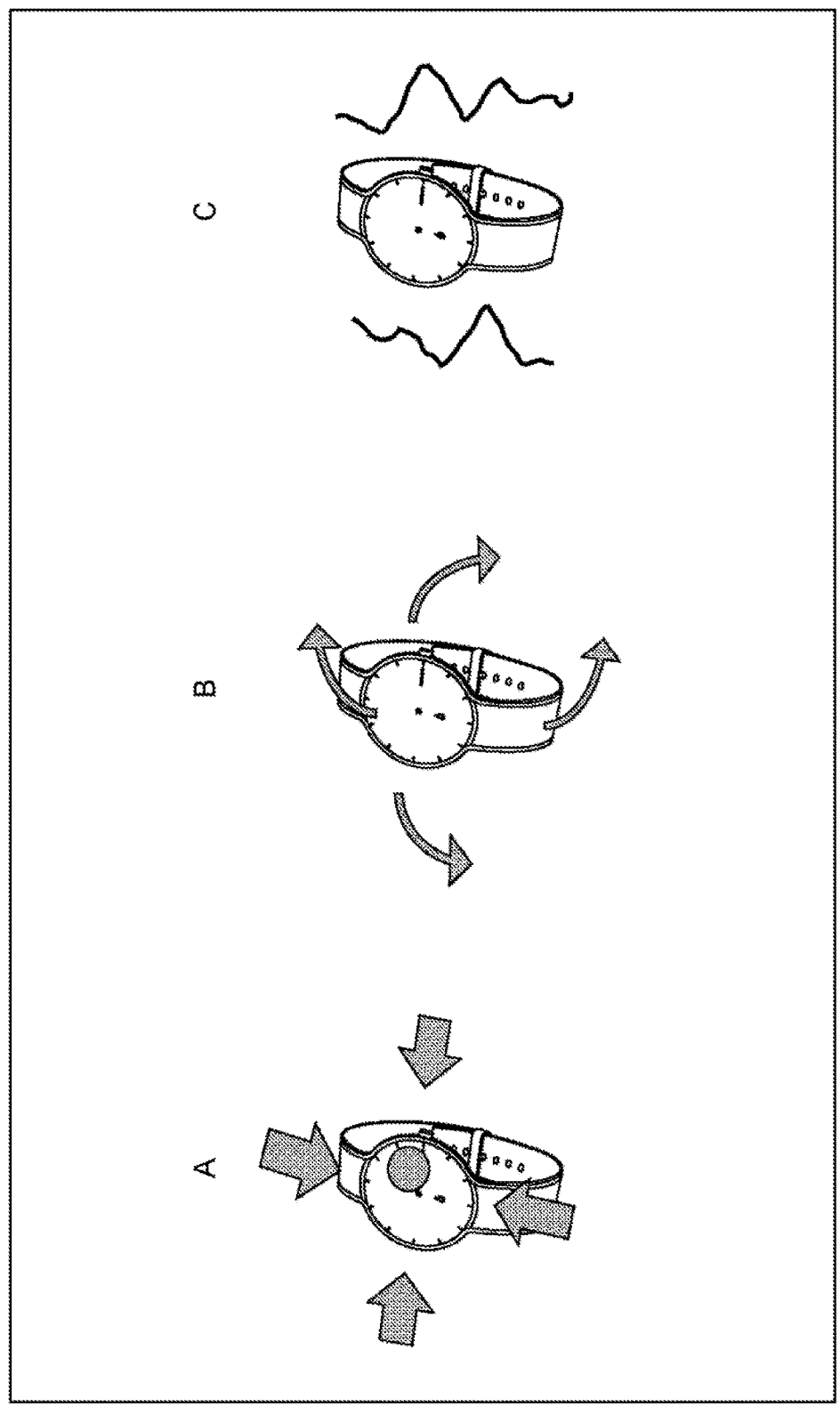
FIG. 15 is a diagram illustrating examples of other action of the action detection process.

FIG. 15 illustrates examples of other actions that can be determined by the controller 66.

For example, the controller 66 can determine an action of tapping (tapping) an upper surface (top surface), or the right-hand, left-hand, near side, or far side surface of the wristwatch 1 as illustrated in A of FIG. 15.

For example, the controller 66 can determine an action of turning the wristwatch 1 toward the right, left, front, or back as illustrated in B of FIG. 15.

For example, the controller 66 can determine an action of shaking (shaking) the wristwatch 1 as illustrated in C of FIG. 15.

Such various actions can cooperate with various displays of the display unit 11.

When, for example, an action of shaking the wristwatch 1 twice in a short time is detected, the controller 66 can perform control to display the current time on the display unit 11 whose display is off. In such a case, when the wristwatch 1 is placed on a table, the time can be checked only by one hand in a simple shaking action.

Moreover, if, for example, the way the pattern (display pattern) of the display unit 11 changes is presented to another user, the wristwatch 1 can perform display control to change to the next pattern by turning the wristwatch 1 outward and return to the previous pattern by turning the wristwatch 1 inward.

The above-mentioned various actions can also be used as time setting operations, and the user's operations detected in the display pattern change process described in FIG. 12. If all of various setting operations and display change operations are performed by the detection of actions, a hardware button such as the push button 28 can also be eliminated. Display in cooperation with the action detection makes it possible to implement a comfortable, intuitive operation.

The display unit 11 of the embodiment includes the segment areas 141, the number of kinds of display patterns of which is limited to 36 as described with reference to FIG. 11. However, if a given pattern (display image) can be displayed on the display unit 11, such displays in accordance with the actions as illustrated in FIG. 16 can also be further provided.

Figure 16:
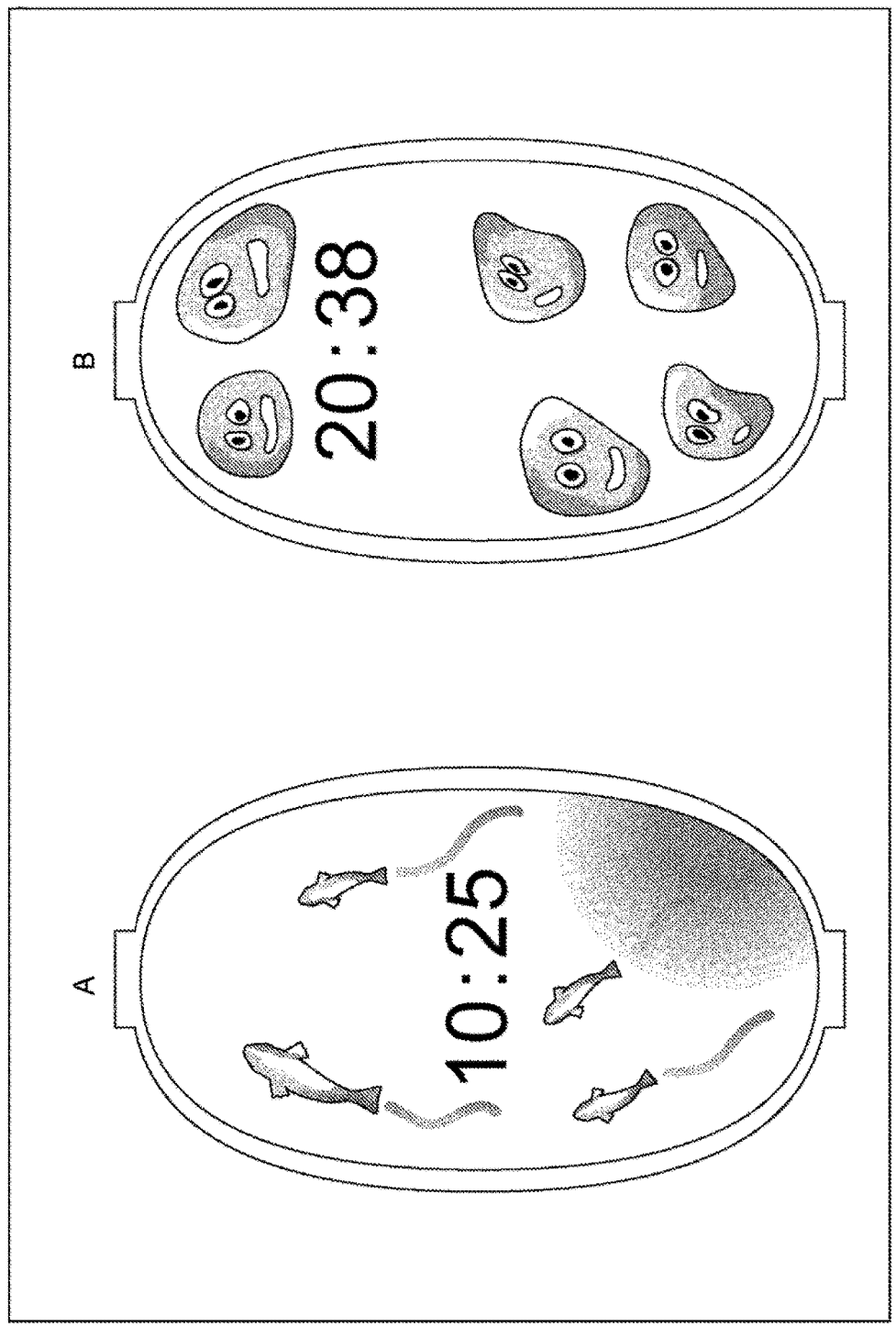
FIG. 16 is a diagram illustrating a display example of the action detection process.

A of FIG. 16 is a display example of an image (pattern) where fish is swimming. For example, if the user shakes the wristwatch 1, the display unit 11 provides a display where the water surface waves and fish moves swiftly. Moreover, if, for example, the user taps on the right-hand side of the wristwatch 1, the display unit 11 provides a display where the fish runs to the left-hand side opposite to the tapped position.

B of FIG. 16 is a display example of an image (pattern) of a slime-like character. If, for example, the user shakes the wristwatch 1, the display unit 11 provides a display where the slime-like character wobbles. Moreover, if, for example, the user taps on the right-hand side of the wristwatch 1, the display unit 11 provides a display where the right-hand portion of the slime-like character is distorted.

In this manner, if the display unit 11 can display a given pattern, it is also possible to offer pleasure in changing the pattern in step with the action.

<Power Save Process>

The wristwatch 1 executes a power save process to minimize power consumption and make the operation last long with the battery 72. Among the configurations of the wristwatch 1 described with reference to FIG. 2, the accelerometer 63 and the controller 66 consume relatively large standby power.

Hence, the accelerometer 63 adopts one where a sampling rate being a time interval for detecting acceleration can be selected from a plurality of sampling rates such as a low sampling rate and a high sampling rate. The accelerometer 63 is set in such a manner as to operate at the low sampling rate to reduce the power to be consumed.

On the other hand, the controller 66 has, as operating modes, an active mode where all functions are running in an executable manner, and a low power mode where only the input of a signal from the outside can be detected. The controller 66 is normally in the standby state in low power mode. Then, if the button operation on the push button 28 or the sensor output from the accelerometer 63 is detected, the operating mode of the controller 66 is changed to the active mode.

The power save process by the wristwatch 1 is described with reference to a flowchart of FIG. 17.

Figure 17:
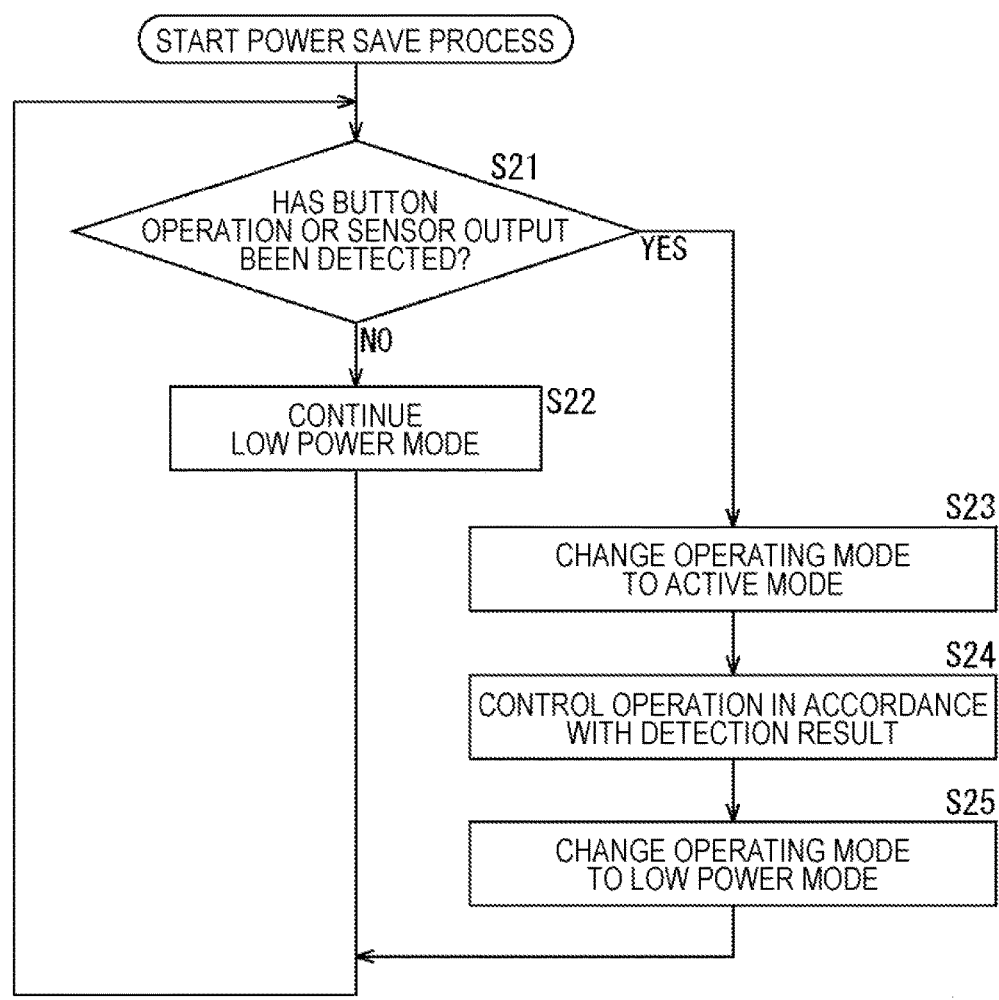
FIG. 17 is a flowchart describing a power save process.

Incidentally, the controller 66 is assumed to be set in low power mode as an initial state before the power save process of FIG. 17 is started.

Firstly in step S21, the controller 66 determines whether or not the button operation on the push button 28 or the sensor output from the accelerometer 63 has been detected.

If it is determined in step S21 that the button operation or the sensor output has not been detected, the processing proceeds to step S22. The controller 66 continues executing the low power mode.

On the other hand, if it is determined in step S21 that the button operation or the sensor output has been detected, the processing proceeds to step S23. The controller 66 changes the operating mode to the active mode.

Then, in step S24, the controller 66 controls the operation in accordance with the detection result. For example, if the button operation of starting the display pattern change mode, or more specifically, the operation of holding down the push button 28 for a fixed period of time, has been detected in step S21, the controller 66 starts the display pattern change mode as described as step S2 of FIG. 12. Moreover, if, for example, the sensor output indicating that the user has performed the operation of looking at the wristwatch 1 has been detected in step S21, the controller 66 changes the display pattern of the display unit 11 in such a manner as to display the current time.

When control over the operation according to the detection result ends, the processing proceeds to step S25. The controller 66 changes the operating mode to the low power mode.

After step S22 or S25, the processing returns again to step S21 to repeat the above-mentioned processing.

The wristwatch 1 executes the above power save process; accordingly, the accelerometer 63 operates at the low sampling rate all the time, and the controller 66 is normally put in the standby state in low power mode capable of detecting only the input of a signal from the outside. Therefore, power consumption can be reduced.

<Power Save Switching Process>

When the battery capacity (residual voltage) of the battery 72 is decreased to or below a fixed level, the controller 66 receives a signal indicating as such from the residual voltage detection unit 73 to switch the display of the display unit 11 from a normal power mode to a power save mode for a display with less power consumed.

Figure 18:
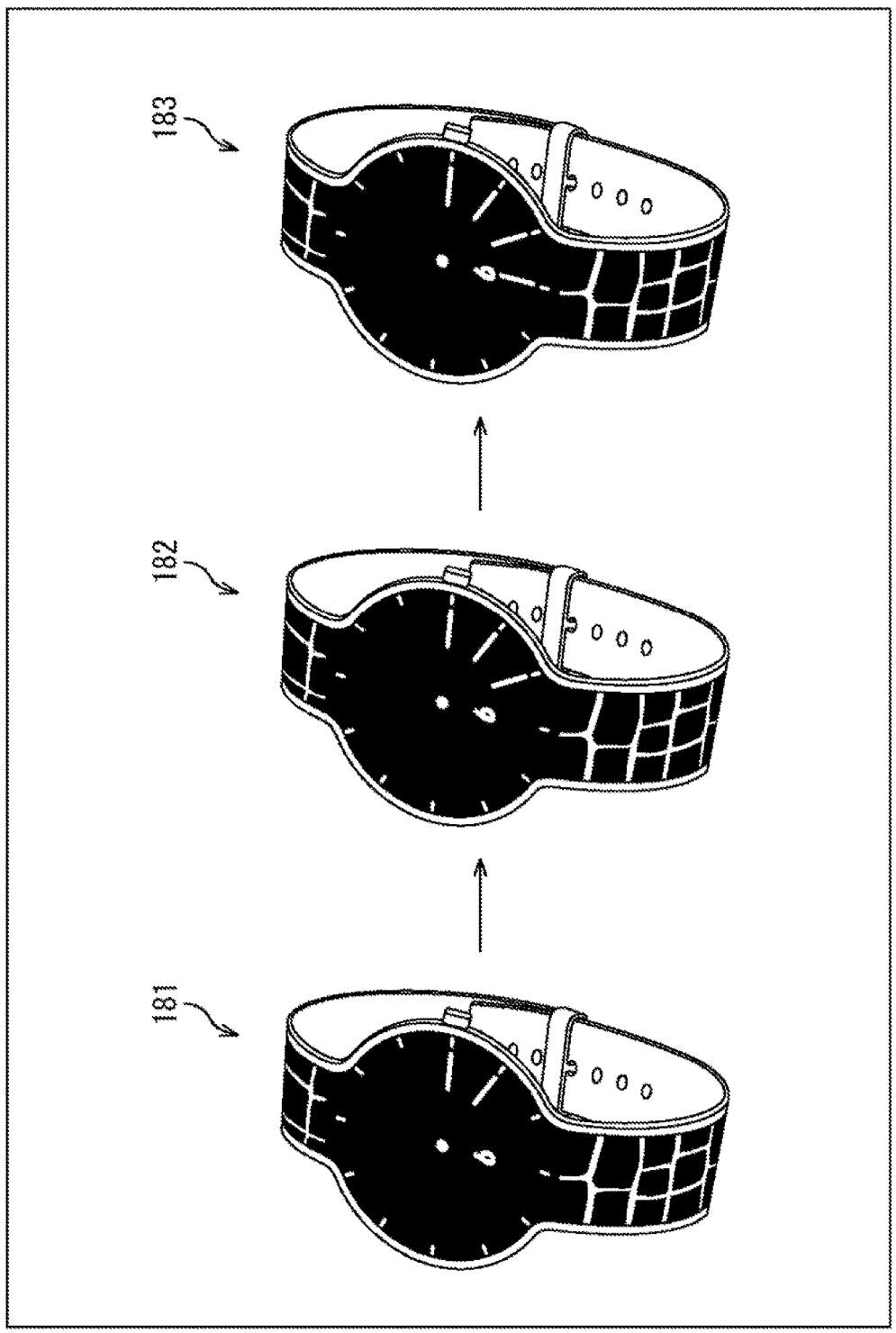
FIG. 18 is a diagram illustrating an example of display control in power save mode.

FIG. 18 illustrates an example of display control in power save mode.

Incidentally, FIG. 18 illustrates an example where the display of the minute hand is updated every five minutes to make the drawing easier to see.

When the time has changed from 6:15 to 6:20, the controller 66 performs display control to turn off (hide) the display of the minute hand at 15 minutes and turn on (show) the display of the minute hand at 20 minutes in normal power mode.

In contrast, in power save mode, the controller 66 performs display control to maintain the display of the minute hand at 15 minutes and turn on the display of the minute hand at 20 minutes without performing control to turn off the display of the minute hand at 15 minutes as in a display state 181.

When the time has changed to 6:20 to 6:25, the controller 66 performs display control to maintain the display of the minute hands at 15 minutes and 20 minutes and turn on the display of only the minute hand at 25 minutes as in a display state 182.

Similarly, when the time has changed from 6:25 to 6:30, the controller 66 performs display control to turn on the display of only the minute hand at 30 minutes as in a display state 183.

In this manner, in power save mode, the controller 66 displays (inversely drives) only the segment area 141 required to display the current time and does not delete (does not inversely drive) the segment area 141 used to display the previous time. Consequently, the number of the segment areas 141 to be driven is less in power save mode than in normal power mode; accordingly, power save display is achieved.

Moreover, in this manner, the face section 21 provides a display different from one in normal power mode such as that a plurality of minute hands is displayed at the same time. Accordingly, the user can grasp the fact that the battery capacity of the battery 72 has decreased to or below the fixed level.

Figure 19:
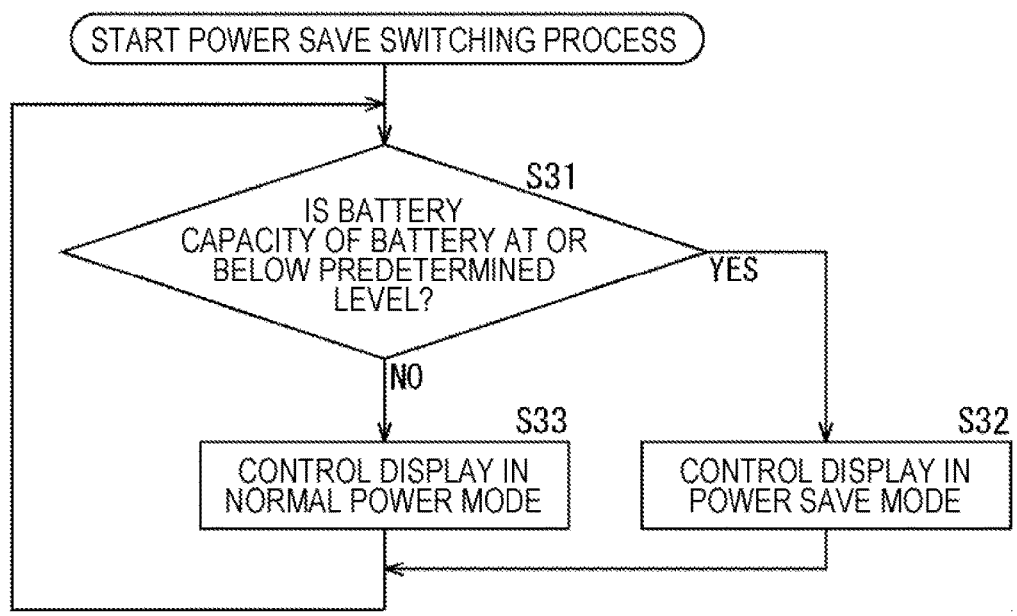
FIG. 19 is a flowchart describing a power save switching process.

FIG. 19 is a flowchart of the power save switching process of switching the display method of the display unit 11 according to the battery capacity of the battery 72.

Firstly in step S31, the controller 66 uses a residual voltage detection signal supplied from the residual voltage detection unit 73 to determine whether or not the battery capacity of the battery 72 is at or below a predetermined level.

If it is determined in step S31 that the battery capacity of the battery 72 is at or below the predetermined level, the processing proceeds to step S32. The controller 66 controls the display in power save mode. For example, the controller 66 controls the display in such a manner as described with reference to FIG. 18. Moreover, for example, as the display control in power save mode, the controller 66 may control the electrophoretic display 51 at a lower driving voltage than in normal power mode, and perform display control with low contrast. Alternatively, the display control in power save mode can also be set as display control where the rewriting frequency of the time display is lower than in normal power mode.

On the other hand, if it is determined in step S31 that the battery capacity of the battery 72 is not at or below the predetermined level, the processing proceeds to step S33. The controller 66 performs the display control in normal power mode.

After the processing of step S32 or S33, the processing returns again to step S31 to execute the above-mentioned processing.

As described above, when the battery capacity of the battery 72 is at or below a fixed level, the wristwatch 1 can provide a power save display making use of the features of drive control over the electrophoretic display 51, and also provide a display that allows the user to grasp the low voltage state.

Incidentally, the displays in normal power mode and power save mode can be those other than the above-mentioned examples.

For example, the wristwatch 1 may provide the above-mentioned normal watch mode display in normal power mode, and the above-mentioned action detection mode display in power save mode.

The display control in power save mode that allows the user to grasp the low voltage state may provide, for example, an afterimage-like display of the minute hands that displays a plurality of minute hands including a minute hand corresponding to the current time and one or more minute hands displayed before the current time.

<2. Second Embodiment of Watch>

Next, the second embodiment of the watch according to the present disclosure is described.

Figure 20:
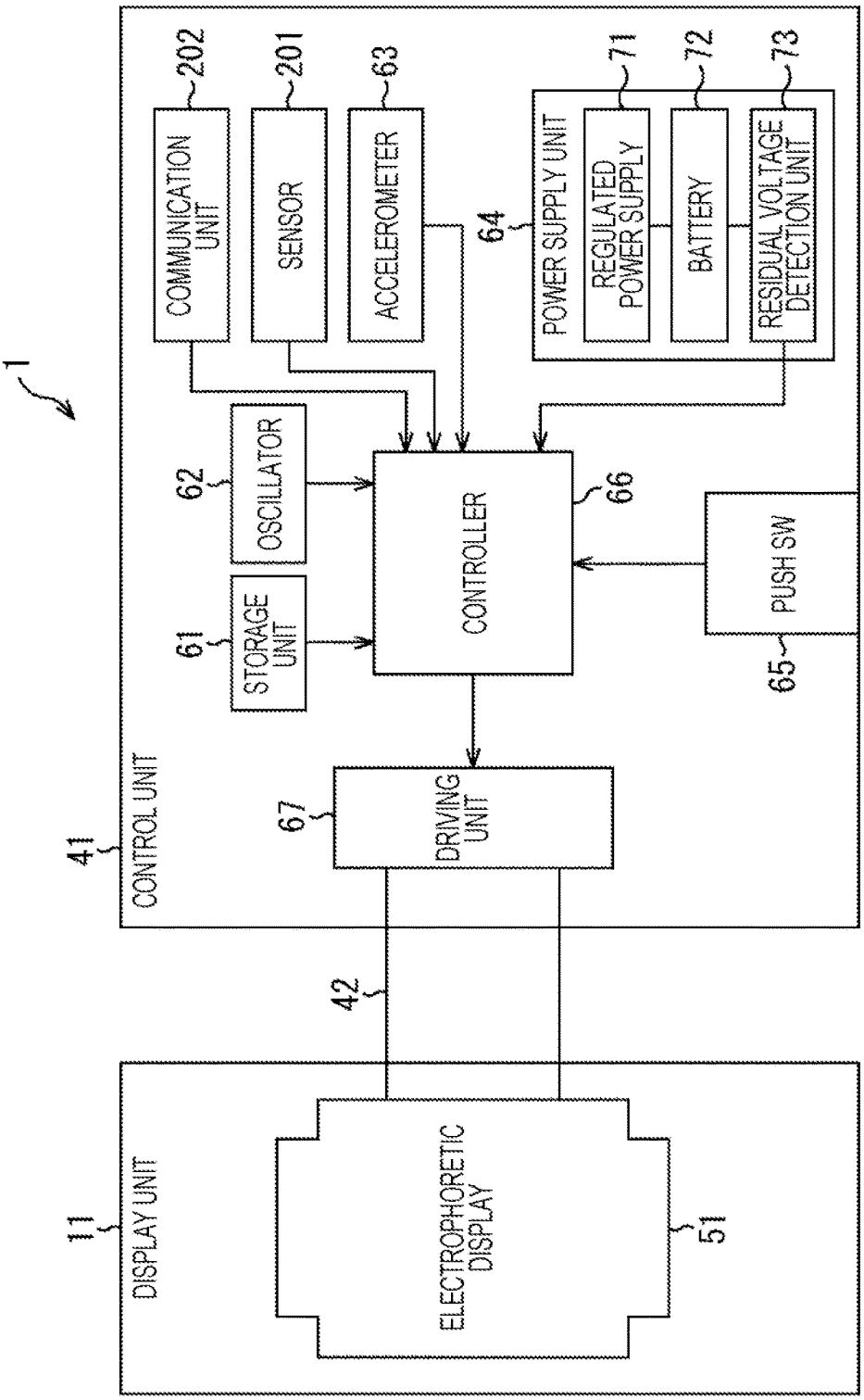
FIG. 20 is a control block diagram related to display control of a wristwatch according to a second embodiment.

FIG. 20 illustrates a control block diagram related to display control over the wristwatch 1 in the second embodiment.

In FIG. 20, the same reference signs are assigned to parts corresponding to the first embodiment. Their descriptions are omitted as appropriate.

The second embodiment is different from the first embodiment in the point that the sensor 201 of a different type from the accelerometer 63, and a communication unit 202 are newly provided in the control unit 41.

The wristwatch 1 includes the sensor 201 of a different type from the accelerometer 63 to enable the detection of an event different from one detected by the accelerometer 63, and a change in the display pattern of the display unit 11.

If, for example, the sensor 201 is a temperature sensor that detects temperature, the controller 66 changes the display pattern of the display unit 11, for example, displaying a specific pattern design according to the detected temperature.

If, for example, the sensor 201 is a humidity sensor that detects humidity, the controller 66 changes the display pattern of the display unit 11, for example, displaying a specific pattern design according to the detected humidity.

If, for example, the sensor 201 is a pressure sensor that detects pulsations in the arm of the user, the controller 66 changes the display pattern of the display unit 11, for example, displaying a specific pattern design according to the detected heart rate. The specific pattern design according to the heart rate can be a display that prompts the user to exercise caution.

If, for example, the sensor 201 is a brightness sensor that detects ambient brightness, the controller 66 changes the display pattern of the display unit 11, for example, displaying a specific pattern design according to the detected lightness. Moreover, the tone of the display unit 11 may be changed according to lightness.

If, for example, the sensor 201 is an odor sensor that detects ambient odor, the controller 66 changes the display pattern of the display unit 11, for example, displaying a specific pattern design according to the detected odor.

If, for example, the sensor 201 is an imaging sensor that captures an image of its surroundings, the controller 66 performs image recognition with the captured image to detect the direction of the line of sight of the user. The controller 66 then changes the display pattern of the display unit 11, for example, displaying a specific pattern design according to the detected direction of the line of sight. When, for example, the user's line of sight is directed toward the wristwatch 1, the controller 66 changes the display pattern of the display unit 11. A detection target whose direction of the line of sight is detected may not be the user wearing the wristwatch 1 but another user in the vicinity.

If, for example, the sensor 201 is a touch sensor that detects the user's contact (touch), the controller 66 detects a touch operation, a stroking operation, a tracing operation, or the like, which was performed by the user on the wristwatch 1, and changes the display pattern of the display unit 11 according to the detected operation. If the sensor 201 is a touch sensor, the touch sensor may be stacked on an upper surface of the display unit 11, or may be placed at a position different from the display unit 11 such as a side surface portion of the wristwatch 1, as with the push button 28.

If, for example, the sensor 201 is a position detection sensor that can detect the location of the wristwatch 1, such as a global positioning system (GPS), the controller 66 changes the display pattern of the display unit 11 according to the location of the user who is wearing the wristwatch 1.

Moreover, if, for example, the controller 66 can acquire the location information of the wristwatch 1 worn by another user (for example, a friend) via the communication unit 202, the controller 66 changes the display pattern of the display unit 11 according to the location of the other user. Consequently, if a friend of the user is near the user, the display pattern of the display unit 11 is changed to let the user know.

Furthermore, if the controller 66 can acquire item information that identifies an item (article) worn by another user (for example, a friend), such as a wristwatch or bag, together with the location information via the communication unit 202, the display pattern of the display unit 11 is changed according to the acquired item information and location information. Consequently, if a person carrying the same item as the user's is near the user, the display pattern of the display unit 11 is changed to let the user know.

The sensor 201 can be one of the above-mentioned temperature sensor, humidity sensor, pressure sensor, brightness sensor, odor sensor, imaging sensor, touch sensor, position detection sensor, and the like. Moreover, the control unit 41 may include a plurality of the above-mentioned sensors 201 other than the accelerometer 63.

The communication unit 202 is a communication device that communicates wirelessly with another communication device such as a smartphone in, for example, near field communication (NFC), infrared communication, or BLUETOOTH (registered trademark). In this case, the communication unit 202 communicates wirelessly with the other communication device, acquires data provided from the other communication device, and supplies the data to the controller 66.

Moreover, the communication unit 202 may be a communication device that is connected to a network such as the Internet, a local area network (LAN), or a wide area network (WAN). In this case, the communication unit 202 connects to another communication device such as a server device via the network, acquires data provided from the other communication device, and supplies the data to the controller 66. In other words, in the embodiment, the type of wireless communication used by the communication unit 202 is not limited, and a given type can be adopted.

For example, the communication unit 202 receives, from another communication device, design data corresponding to the display pattern of the display unit 11, and supplies the received design data to the controller 66. The controller 66 stores the design data acquired from the communication unit 202 in the storage unit 61.

Therefore, if the wristwatch 1 has the communication function, the user can acquire (download), in the wristwatch 1, design data different from the design data stored in advance in the storage unit 61. Consequently, the display pattern of the wristwatch 1 can be changed to a display pattern different from the display patterns prepared in advance.

<Configuration Example of Display Pattern Providing System>

It is possible to construct, for example, a system where creators create and provide design data corresponding to display patterns that can be displayed on the wristwatch 1, and the user of the wristwatch 1 purchases a desired display pattern that the user wants to display on his/her own wristwatch 1.

Figure 21:
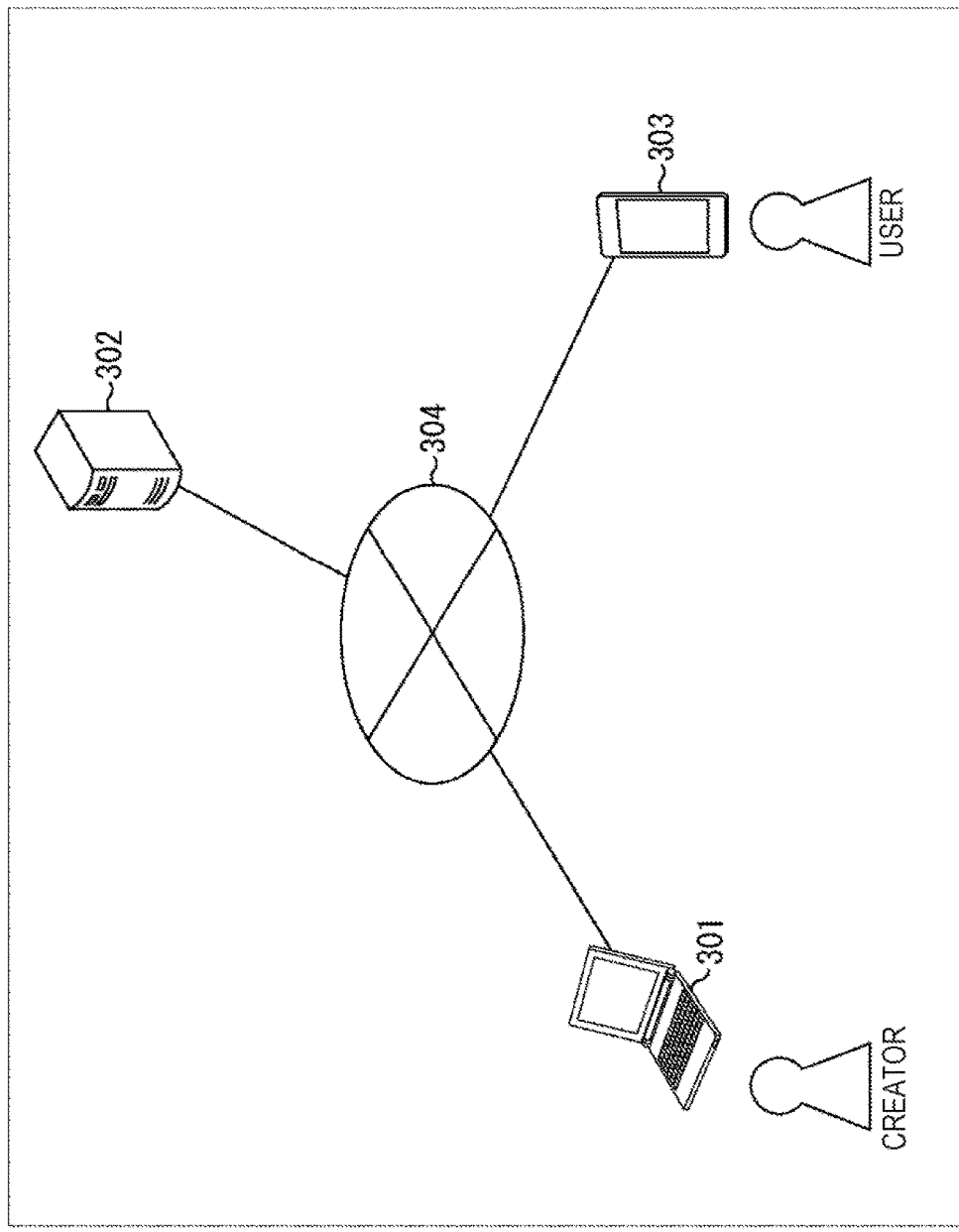
FIG. 21 is a diagram illustrating a configuration example of a display pattern providing system.

FIG. 21 illustrates a configuration example of a display pattern providing system (communication system) that offers a design providing service that enables the giving and receiving of design data between a creator and the user.

The display pattern providing system is configured including at least a terminal apparatus 301 to be operated by the creator, a server 302 in which design data of display patterns provided by creators to the user is stored, and a terminal apparatus 303 into which the user downloads design data. In the display pattern providing system, in reality, many creators and users can use their own terminal apparatuses to access the server 302. However, for simplicity of description, a case of one creator and one user is described.

Each of the terminal apparatuses 301 and 303 includes, for example, a personal computer (PC), a note PC, a tablet, or a smartphone, and has at least a network communication function. In the following description, the creator's terminal apparatus 301 is referred to as the creator terminal 301, and the user's terminal apparatus 303 as the user terminal 303.

The creator terminal 301, the server 302, and the user terminal 303 are connected via a network 304 such as the Internet, a local area network (LAN), or a wide area network (WAN).

The server 302 stores design data uploaded by creators, and also provides the user design data provided by many creators on the Web when the user accesses a predetermined address (URL) of the server 302. In other words, the server 302 establishes an Internet shop that provides design data corresponding to display patterns of the wristwatch 1.

Figure 22:
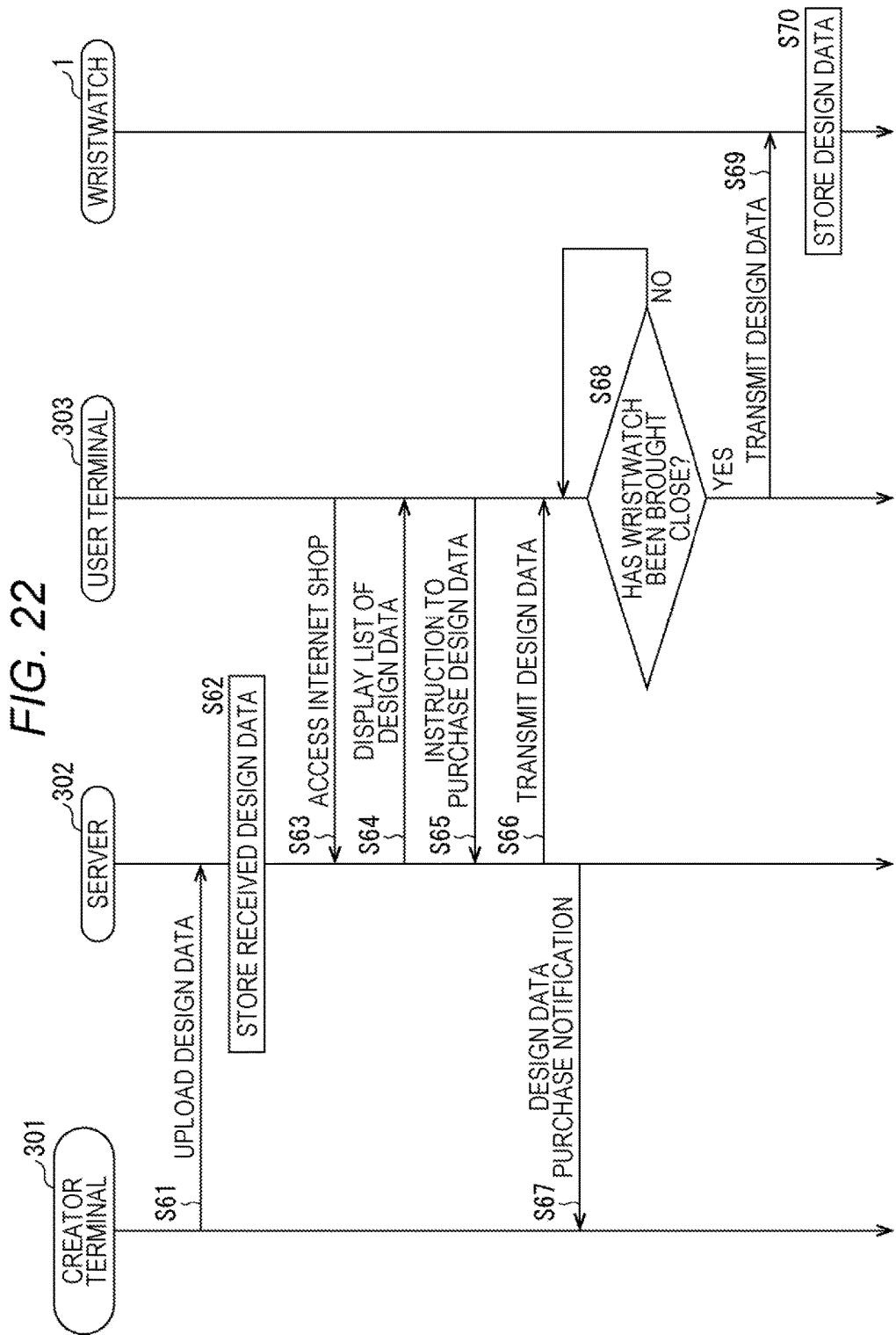
FIG. 22 is a flowchart describing a design data providing process.

A description is given of a design data providing process to be executed by the display pattern providing system of FIG. 21 with reference to a flowchart of FIG. 22.

Incidentally, in the description of FIG. 22, a description is given assuming that the user terminal 303 is a smartphone, and the user terminal 303 and the wristwatch 1 communicate wirelessly with each other in NFC.

Firstly, the creator creates design data that can be displayed on the wristwatch 1. Then, in step S61, the creator terminal 301 uploads (transmits) the design data created for the wristwatch 1 to the server 302 in accordance with an operation of the creator.

In step S62, the server 302 receives the design data transmitted from the creator terminal 301 to store the received design data in its internal storage unit.

In step S63, the user terminal 303 accesses a predetermined address of the server 302 through a browser or the like in accordance with the user's operation to access a site (Internet shop) that can browse and purchase design data created by many creators for the wristwatch 1.

In step S64, the server 302 transmits a web page that displays a list of the display patterns created by the many creators for the wristwatch 1 to the user terminal 303 at the request of the browser of the user terminal 303, and displays the list of the design data on a display of the user terminal 303.

When the user looks at the list of the design data and performs an operation of purchasing a desired piece of the design data, an instruction to purchase the design data on which the purchase operation has been performed is transmitted from the user terminal 303 to the server 302 in step S65.

In step S66, the server 302 receives the instruction to purchase the design data from the user terminal 303, and transmits the specified design data to the user terminal 303. The user terminal 303 receives the design data transmitted from the server 302 and stores the design data in its internal storage unit.

Furthermore, in step S67, the server 302 transmits a purchase notification indicating the purchase of the design data of the creator to the creator terminal 301 that uploaded the purchased design data.

When transmitting the design data purchase notification to the creator terminal 301, the server 302 can transmit purchaser information indicating what kind of user purchased the design data of the creator such as whether the user is male or female, and the user's generation (teens, twenties, or the like) on the basis of, for example, the user's login information and registration information.

Moreover, if the server 302 can acquire, for example, the location information of the user terminal 303, for example, location information indicating where the design data of the creator was downloaded can also be provided to the creator.

The user performs an operation of bringing the wristwatch 1 desired to display a display pattern of the downloaded design data close to the user terminal 303. The user terminal 303 determines whether or not the wristwatch 1 has been brought close to it in step S68, and repeats the processing of step S68 until determining that the wristwatch 1 has been brought close to it.

Then, if it is determined in step S68 that the wristwatch 1 has been brought close, the processing proceeds to step S69, and the user terminal 303 transmits the design data in wireless communication to the wristwatch 1.

In step S70, the wristwatch 1 receives the design data transmitted in wireless communication from the user terminal 303 to store the design data in the storage unit 61.

With the above processing, the new design data is stored in the storage unit 61 of the wristwatch 1. Then, the above-mentioned display pattern change process is executed to enable the display of the display pattern based on the acquired new design data on the display unit 11.

Incidentally, in this example, the description has been given assuming that the user purchases the design data of the creator. However, the system may be configured to allow the user to acquire and use design data for free. Moreover, in addition to the acquisition and use of design data designed by creators, the user of the wristwatch 1 may design a display pattern by himself/herself, and change the display pattern freely. In this case, the user of the wristwatch 1 designs a display pattern by himself/herself using, for example, an application incorporated in the user terminal 303, and the design data is transmitted to the wristwatch 1 in, for example, wireless communication.

<Example where Information Other than Display Pattern Corresponding to Design Data is Displayed>

The electrophoretic display 51 of the display unit 11 includes the plurality of divided segment areas 141 corresponding to predetermined display patterns as described with reference to FIG. 11.

However, the electrophoretic display 51 may include a plurality of segment areas obtained by dividing the whole display area in a two-dimensional array form, and be configured to control the turning on/off of each individual divided segment area by thin film transistors (TFTs). If the electrophoretic display 51 includes such a two-dimensional array capable of active matrix control, the number of kinds of patterns that can be displayed on the display unit 11 can be increased.

Alternatively, only a part of the display area of the display unit 11, for example, only a part of the area of the band section 22, maybe set as a two-dimensional array segment area capable of active matrix control.

Figure 23:
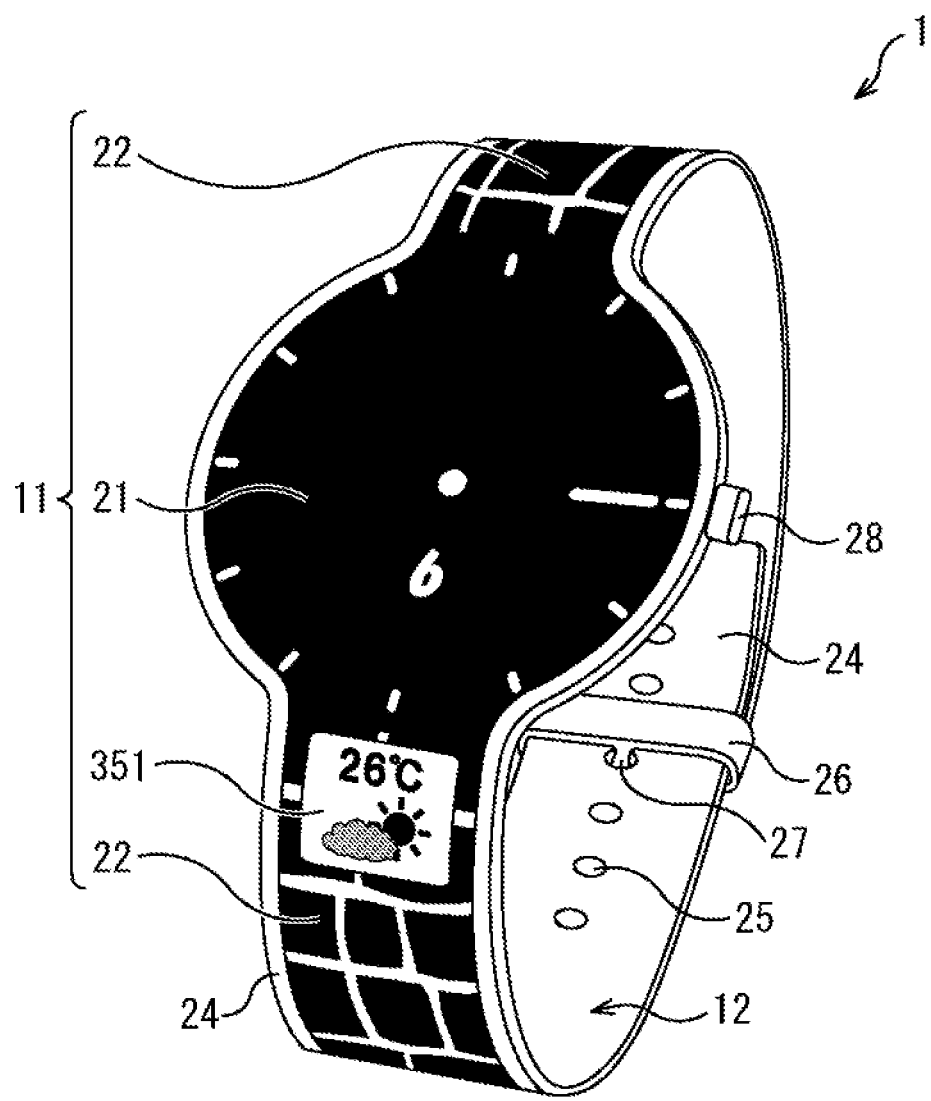
FIG. 23 is a diagram illustrating an example of a wristwatch including a two-dimensional array segment area in a display unit.

FIG. 23 illustrates an example of the wristwatch 1 where part of the area of the band section 22 of the display unit 11 is set as a two-dimensional array segment area 351.

As an example where the sensor 201 is, for example, a temperature sensor that detects temperature, a temperature (26° C.) detected by the sensor 201 is displayed in the two-dimensional array segment area 351.

Moreover, as an example where the communication unit 202 connects to a server device that provides weather information via a network to acquire the weather information of a location where the user wearing the wristwatch 1 is, an image (mark) indicating the acquired weather information (fair, occasionally cloudy) is also displayed in the two-dimensional array segment area 351.

Information such as date and a day of the week generally displayed as a wristwatch may be displayed in the two-dimensional array segment area 351.

In this manner, the band section 22 of the wristwatch 1 is not limited to those simply displaying pattern designs of a band or a bracelet. Consequently, predetermined information can be displayed not only on the face section 21 but also on the band section 22 of the wristwatch 1. Accordingly, a wide variety of information can be presented to the user.

Therefore, the wristwatch 1 of the above-mentioned embodiments can be said to be an information display apparatus that can display predetermined information not only on the face section 21 but also on the band section 22.

Incidentally, in the present description, the steps described in the flowcharts do not necessarily need to be processed in chronological order, and may be executed in parallel or at necessary timings such as when a call is made, naturally including a case where the steps are executed in chronological order along the described sequence.

Moreover, the above-mentioned processes may be executed independently, or may be executed in parallel.

In the present description, the system indicates an assembly of a plurality of components (such as devices and modules (parts)) and whether or not all the components are in the same casing does not matter. Therefore, a plurality of devices housed in different casings and connected via a network, and one device in which a plurality of modules is housed in one casing are both the systems.

Embodiments of the present disclosure are not limited to the above-mentioned embodiments, and various modifications can be made within a range that does not depart from the gist of the present disclosure.

For example, a mode where all or part of the above-mentioned plurality of embodiments are combined can be adopted.

If, for example, the wristwatch 1 has a communication function, a configuration of cloud computing where a cloud server performs part of the processes described assumed to be performed by the wristwatch 1 can be adopted.

Moreover, each step described in the above-mentioned flowcharts can be shared and executed by a plurality of devices in addition to being executed by one device.

Furthermore, if one step includes a plurality of processes, the plurality of processes included in the one step can be shared and executed by a plurality of devices in addition to being executed by one device.

Incidentally, the effects described in the present description are mere illustrations and are not limited. There may be effects other than those described in the present description.

Incidentally, the present disclosure can also take the following configurations:

(1)

An information display apparatus including:

a display unit including a time information presenting section for presenting at least time information, and a band section to be worn on an arm; and a display control unit for changing a display of the display unit.

(2)

The information display apparatus according to (1), wherein the display unit includes an electrophoretic display.

(3)

The information display apparatus according to (1) or (2), wherein the display control unit changes the display of the display unit with design data selected from a plurality of pieces of design data.

(4)

The information display apparatus according to (3), further including a storage unit for storing the plurality of pieces of design data.

(5)

The information display apparatus according to (3) or (4), further including a selection unit for selecting one piece of design data from the plurality of pieces of design data.

(6)

The information display apparatus according to any of (1) to (5), further including a communication unit for receiving, from another communication device, design data to be displayed on the display unit, wherein the display control unit changes the display of the display unit with the received design data.

(7)

The information display apparatus according to any of (1) to (6), further including a sensor for detecting a state of the information display apparatus, wherein the display control unit changes a display of the time information presenting section with a detection result of the sensor.

(8)

The information display apparatus according to (7), wherein the sensor is an accelerometer, and the display control unit changes the display of the time information presenting section with an inclined state of the information display apparatus.

(9)

The information display apparatus according to (8), wherein upon the information display apparatus being determined to be in a horizontal state, the display control unit changes the display of the time information presenting section.

(10)

The information display apparatus according to (7), wherein the sensor is an accelerometer, and upon a user wearing the information display apparatus being determined to have looked at the information display apparatus with the detection result of the sensor, the display control unit changes the display of the time information presenting section.

(11)

The information display apparatus according to any of (7) to (10), wherein the sensor is an accelerometer, and the display control unit determines an action of a user on the information display apparatus with the detection result of the sensor to change the display of the time information presenting section.

(12)

The information display apparatus according to any of (7) to (11), wherein the display control unit also changes a display of the band section together with the display of the time information presenting section.

(13)

The information display apparatus according to any of (1) to (12), further including a residual voltage detection unit for detecting a residual voltage of a power supply of the information display apparatus, wherein the display control unit changes the display of the display unit with a detection result of the residual voltage detection unit.

(14)

The information display apparatus according to (13), wherein upon the residual voltage of the power supply being at or below a predetermined level, the display control unit makes a change to a display that notifies a low voltage state.

(15)

The information display apparatus according to any of (1) to (14), wherein a display of the band section is a display representing a pattern design.

(16)

An information display method of an information display apparatus, including a display control unit of the information display apparatus changing a display of a display unit including a time information presenting section for presenting at least time information and a band section to be worn on an arm.

(17)

A program for causing a computer to function as a display control unit for changing a display of a display unit including a time information presenting section for presenting at least time information and a band section to be worn on an arm.

(18)

A communication system including:

an information display apparatus; and a terminal apparatus, wherein the information display apparatus includes a display unit including a time information presenting section for presenting at least time information, and a band section to be worn on an arm, a display control unit for changing a display of the display unit, and a communication unit for receiving, from the terminal apparatus, design data to be displayed on the display unit, and the terminal apparatus transmits the design data to the communication unit.

REFERENCE SIGNS LIST

1 Wristwatch
11 Display unit
21 Face section
22 Band section
24 Rubber band
28 Push button
41 Control unit
51 Electrophoretic display
61 Storage unit
63 Accelerometer
66 Controller
67 Driving unit
73 Residual voltage detection unit
201 Sensor
202 Communication unit
302 Server
303 Terminal apparatus
351 Two-dimensional array segment area

The invention claimed is:

1. An information display apparatus comprising:
a display unit including a time information presenting section for presenting at least time information, and a band section to be worn on an arm; and
a processing device configured to control
determining whether to perform control of a display of the display unit in a power save mode in accordance with a detection result of detecting a residual voltage of a power supply of the information display apparatus,
while in the power save mode, turning on
a first segment area of the display at a first time during the power save mode, and
turning on a second segment area of the display at a second time during the power save mode which is after the first time, in which at the second time the first segment area is in a turned on state from being turned on at the first time, and
while not in the power save mode, turning off the first segment area when turning on the second segment area.

2. The information display apparatus according to claim 1, wherein the display unit includes an electrophoretic display.

3. The information display apparatus according to claim 1, wherein the processing device is configured to control changing the display of the display unit with design data selected from a plurality of pieces of design data.

4. The information display apparatus according to claim 3, wherein the processing device is configured to control storing the plurality of pieces of design data.

5. The information display apparatus according to claim 3, wherein the processing device is configured to control selecting one piece of design data from the plurality of pieces of design data.

6. The information display apparatus according to claim 1, wherein the processing device is configured to control:
receiving, from another communication device, design data to be displayed on the display unit, and changing the display of the display unit with the received design data.

7. The information display apparatus according to claim 1, further comprising a sensor for detecting a state of the information display apparatus, and
wherein the processing device is configured to control changing a display of the time information presenting section with a detection result of the sensor.

8. The information display apparatus according to claim 7,
wherein the sensor is an accelerometer, and
the processing device is configured to control changing the display of the time information presenting section with an inclined state of the information display apparatus.

9. The information display apparatus according to claim 8, wherein upon the information display apparatus being determined to be in a horizontal state, the processing device is configured to control changing the display of the time information presenting section.

10. The information display apparatus according to claim 7,
wherein the sensor is an accelerometer, and
upon a user wearing the information display apparatus being determined to have a first state at the information display apparatus with the detection result of the sensor, the processing device is configured to control changing the display of the time information presenting section.

11. The information display apparatus according to claim 7,
wherein the sensor is an accelerometer, and
the processing device is configured to control determining an action of a user on the information display apparatus with the detection result of the sensor to change the display of the time information presenting section.

12. The information display apparatus according to claim 7, wherein the processing device is configured to control changing a display of the band section together with the display of the time information presenting section.

13. The information display apparatus according to claim 1, wherein the processing device is configured to control detecting the residual voltage of the power supply of the information display apparatus.

14. The information display apparatus according to claim 13, wherein upon the residual voltage of the power supply being at or below a predetermined level, the processing device is configured to control changing a display that notifies a low voltage state.

15. The information display apparatus according to claim 1, wherein a display of the band section is a display representing a pattern design.

16. An information display method of an information display apparatus, the method comprising:
controlling, by a processing device,
changing a display of a display unit including a time information presenting section for presenting at least time information and a band section to be worn on an arm;
determining whether to perform control of a display of the display unit in a power save mode in accordance with a detection result of detecting a residual voltage of a power supply of the information display apparatus;
while in the power save mode, turning on
a first segment area of the display at a first time during the power save mode, and turning on a second segment area of the display at a second time during the power save mode which is after the first time, in which at the second time the first segment area is in a turned on state from being turned on at the first time; and while not in the power save mode, turning off the first segment area when turning on the second segment area.

17. A non-transitory storage medium configured to store a program executable by a computer, the program comprising:

changing a display of a display unit including a time information presenting section for presenting at least time information and a band section to be worn on an arm;

determining whether to perform control of a display of the display unit in a power save mode in accordance with a detection result of detecting a residual voltage of a power supply of the information display apparatus;

while in the power save mode,
controlling a first segment area of the display to turn on at a first time during the power save mode, and
controlling a second segment area of the display to turn on at a second time during the power save mode which is after the first time, in which at the second time the first segment area is in a turned on state from being turned on at the first time; and while not in the power save mode, controlling the first segment area to turn off when the processing device controls the second segment area to turn on.

18. A communication system comprising:
an information display apparatus; and
a terminal apparatus,
wherein the information display apparatus includes
a display unit including a time information presenting section for presenting at least time information, and a band section to be worn on an arm, and
a processing device configured to control:
determining whether to perform control of a display of the display unit in a power save mode in accordance with a detection result of detecting a residual voltage of a power supply of the information display apparatus,
while in the power save mode turning on
a first segment area of the display at a first time during the power save mode, and
turning on a second segment area of the display at a second time during the power save mode which is after the first time, in which at the second time the first segment area is in a turned on state from being turned on at the first time,
while not in the power save mode, turning off the first segment area when the second segment area is turned on,
receiving, from the terminal apparatus, design data to be displayed on the display unit, and
wherein the terminal apparatus transmits the design data to the information display apparatus.

\* \* \* \* \*